(12) United States Patent
Aggarwal

(10) Patent No.: US 8,411,691 B2
(45) Date of Patent: Apr. 2, 2013

(54) TRANSFER OF MOBILE SUBSCRIBER CONTEXT IN CELLULAR NETWORKS USING EXTENDED ROUTING PROTOCOL

(75) Inventor: Rahul Aggarwal, San Francisco, CA (US)

(73) Assignee: Juniper Networks, Inc., Sunnyvale, CA (US)

(*) Notice: Subject to any disclaimer, the term of this patent is extended or adjusted under 35 U.S.C. 154(b) by 973 days.

(21) Appl. No.: 12/421,706

(22) Filed: Apr. 10, 2009

(65) Prior Publication Data
US 2010/0177685 A1 Jul. 15, 2010

Related U.S. Application Data

(60) Provisional application No. 61/143,993, filed on Jan. 12, 2009.

(51) Int. Cl.
*H04L 12/56* (2006.01)
(52) U.S. Cl. ......... 370/401; 370/389; 370/400; 370/466
(58) Field of Classification Search .................. None
See application file for complete search history.

(56) References Cited

U.S. PATENT DOCUMENTS

| | | | |
|---|---|---|---|
| 6,915,325 B1 | 7/2005 | Lee et al. |
| 6,954,790 B2 | 10/2005 | Forslow |
| 6,973,057 B1 | 12/2005 | Forslow |
| 7,039,005 B2 | 5/2006 | Jenq et al. |
| 7,080,151 B1 | 7/2006 | Borella et al. |
| 7,082,116 B2 | 7/2006 | Reza et al. |
| 7,085,260 B2 | 8/2006 | Karaul et al. |
| 7,155,518 B2 | 12/2006 | Forslow |
| 7,283,534 B1 | 10/2007 | Kelly et al. |
| 7,284,068 B1 | 10/2007 | Ramalho |
| 7,286,534 B2 | 10/2007 | Kloth |
| 7,305,429 B2 | 12/2007 | Borella |
| 7,333,482 B2 | 2/2008 | Johansson et al. |
| 7,463,605 B2 | 12/2008 | Choyi et al. |
| 7,564,806 B1 | 7/2009 | Aggarwal et al. |

(Continued)

FOREIGN PATENT DOCUMENTS

| | | |
|---|---|---|
| EP | 1 684 471 A1 | 7/2006 |
| WO | 2004010668 A1 | 1/2004 |

(Continued)

OTHER PUBLICATIONS

Office Action from U.S. Appl. No. 12/190,276, dated, Apr. 24, 2012, 14 pp.

(Continued)

*Primary Examiner* — Donald Mills
(74) *Attorney, Agent, or Firm* — Shumaker & Seiffer, P.A.

(57) ABSTRACT

A new architecture provides network-based mobility in cellular networks that is built on Internet Protocol (IP)/Multiprotocol Label Switching (MPLS) technologies, such as Virtual Private Local Area Network (LAN) Service (VPLS), the Border Gateway Protocol (BGP) and BGP MPLS Layer 3 Virtual Private Networks (VPNs). The architecture consists of several building blocks that provide functionality for different aspects of cellular network mobility. One building block is network-based macro mobility in IP/MPLS networks. The macro mobility techniques described herein are built on extensions to a routing protocol such as BGP. Another building block relates to transferring subscriber context between network devices while preserving the IP address of the subscriber. The techniques described herein provide a subscriber context transfer mechanism for mobile subscriber management that is built on extensions to a routing protocol such as BGP. Another building block of the mobility architecture is network-based micro mobility based on VPLS.

31 Claims, 8 Drawing Sheets

U.S. PATENT DOCUMENTS

| | | |
|---|---|---|
| 7,672,288 B1 | 3/2010 | Iartym |
| 7,729,324 B2 | 6/2010 | Kachi |
| 7,738,871 B2 | 6/2010 | Olvera-Hernandez et al. |
| 7,809,386 B2 | 10/2010 | Stirbu |
| 8,037,302 B2 | 10/2011 | Vaarala et al. |
| 8,081,611 B2 | 12/2011 | Berzin et al. |
| 8,144,593 B2 | 3/2012 | Narayanan et al. |
| 2002/0136226 A1 | 9/2002 | Christoffel et al. |
| 2003/0021275 A1 | 1/2003 | Shabeer |
| 2004/0037237 A1 | 2/2004 | Lalwaney |
| 2004/0064581 A1 | 4/2004 | Shitama et al. |
| 2004/0076179 A1 | 4/2004 | Kaminski et al. |
| 2004/0120295 A1 | 6/2004 | Liu et al. |
| 2005/0259631 A1 | 11/2005 | Rahahalme |
| 2007/0091862 A1* | 4/2007 | Ioannidis ............. 370/338 |
| 2008/0107096 A1 | 5/2008 | Huang |
| 2008/0159230 A1 | 7/2008 | Cho et al. |
| 2009/0086625 A1 | 4/2009 | Nandagopal et al. |
| 2009/0213797 A1 | 8/2009 | Li |
| 2010/0128728 A1 | 5/2010 | Sun et al. |
| 2010/0177685 A1 | 7/2010 | Aggarwal |
| 2010/0177752 A1 | 7/2010 | Aggarwal et al. |
| 2010/0246545 A1 | 9/2010 | Berzin |

FOREIGN PATENT DOCUMENTS

| | | |
|---|---|---|
| WO | 2008045438 A1 | 4/2008 |

OTHER PUBLICATIONS

Office Action from U.S. Appl. No. 12/421,680, dated May 16, 2012, 14 pp.

Final Office Action from U.S. Appl. No. 12/421,693, dated Mar. 15, 2012, 20 pp.

U.S. Appl. No. 61/055,487, filed May 23, 2008 entitled "Transferring Dynamic Subscriber Contexts During Handover in Cellular Networks", Moisand et al.

U.S. Appl. No. 12/190,276, filed Aug. 12, 2008 entitled "Transferring Dynamic Subscriber Contexts During Handover in Cellular Networks", Moisand et al.

U.S. Appl. No. 61/143,993, filed Jan. 12, 2009 entitled "Network-Based Mobility and Context Transfer in Cellular Networks", by Aggarwal et al.

U.S. Appl. No. 12/421,680, filed Apr. 10, 2009 entitled "Network-Based Macro Mobility in Cellular Networks Using an Extended Routing Protocol", by Aggarwal.

U.S. Appl. No. 12/421,693, filed Apr. 10, 2009 entitled "Network-Based Micro Mobility in Cellular Networks Using Extended Virtual Private LAN Service", by Aggarwal et al.

Berzin, O. et al., "Mobility Support Using MPLS and MP-BGP Signaling" draft-berzin-malis-mpls-mobility-02.txt, The IETF Trust, Verizon Communications, Oct. 29, 2008 (61 pgs.).

Rosen, E.C. et al., "BGP/MPLS IP VPNs," draft-ietf-l3vpn-rfc2547bis-03.txt, Network Working Group, Internet Draft, Oct. 2004 (49 pgs.).

Extended European Search Report for Application No. EP 09179616.9, dated May 3, 2010 (7 pp.).

Office Action from U.S. Appl. No. 12/421,693, dated Oct. 13, 2011, 14 pp.

Response to Office Action dated Oct. 13, 2011, from U.S. Appl. No. 12/421,693, filed Jan. 13, 2012, 19 pp.

European Search Report from European international application No. 12158656.4, dated Jun. 26, 2012 , 6 pp.

Chen et al., "Fast Link Layer and Intra-domain Handoffs for mobile Internet," Computer Software and Applications Conference, 2000, COMPSAC 2000, The 24th Annual International Taipei, Taiwan Oct. 25-27, 2000, Los Alamitos, CA, USA, IEEE Comput. Soc, US, pp. 325-330.

Koodli et al., Idle Mode Handover Support in IPv6 Networks draft-koodli-idle-mode-ctv6-000.txt, Seamoby Working Group Internet Draft, Jul. 13, 2001, 17 pp.

Response to Office Action dated Aug. 15, 2012, from U.S. Appl. No. 12/421,693, filed Nov. 15, 2012, 18 pp.

Office Action from U.S. Appl. No. 12/421,693, dated Aug. 15, 2012, 16 pp.

Response to Office Action dated May 16, 2012, from U.S. Appl. No. 12/421,680, filed Aug. 16, 2012, 20 pp.

Response to Office Action dated Apr. 24, 2012, from U.S. Appl. No. 12/190,276, filed Jul. 30, 2012, 22 pp.

\* cited by examiner

TRANSFER OF MOBILE SUBSCRIBER CONTEXT IN CELLULAR NETWORKS USING EXTENDED ROUTING PROTOCOL

This application claims the benefit of U.S. Provisional Application No. 61/143,993, filed Jan. 12, 2009, the entire content of which is incorporated by reference herein.

TECHNICAL FIELD

The invention relates to networks and, more particularly, to cellular networks.

BACKGROUND

A cellular network is a collection of cells that each includes at least one base station capable of transmitting and relaying signals to subscriber's mobile devices. A "cell" generally denotes a distinct area of a cellular network that utilizes a particular frequency or range of frequencies for transmission of data. A typical base station is a tower to which are affixed a number of antennas that transmit and receive the data over the particular frequency. Mobile devices, such as cellular or mobile phones, smart phones, camera phones, personal digital assistants (PDAs) and laptop computers, may initiate or otherwise transmit a signal at the designated frequency to the base station in order to initiate a call or data session and begin transmitting data.

A backhaul network connects the base station to a gateway device. The backhaul network is the layer two (L2) network (from a mobile subscriber's perspective) that provides connectivity from the base station to the gateway device. Several cellular service providers are moving towards Internet Protocol (IP)/Multiprotocol Label Switching (MPLS) based mobile backhaul networks for Second Generation (2G), Third Generation (3G), and other wireless technologies. Microwave Access (WiMax) and Long Term Evolution (LTE) technologies are likely to move in this direction as well. For example, recently, cellular service providers have begun to upgrade cellular networks to support services, such as high-speed access to packet-based networks (e.g., the Internet), voice over Internet protocol (VoIP) and Internet protocol television (IPTV). To upgrade the cellular networks, cellular service providers convert cellular signals, e.g., Time Division Multiple Access (TDMA) signals, Orthogonal Frequency-Division Multiplexing (OFDM) signals or Code Division Multiple Access (CDMA) signals, received at a base station from mobile devices into Internet protocol (IP) packets for transmission within the packet-based networks. A number of standards have been proposed to facilitate this conversion and transmission of cellular signals to IP packets, such as a General Packet Radio Service (GPRS) standardized by the Global System for Mobile Communications (GSM) Association, Mobile IP standardized by the Internet Engineering Task Force (IETF), as well as other standards proposed by the $3^{rd}$ Generation Partnership Project (3GPP), $3^{rd}$ Generation Partnership Project 2 (3GGP/2) and the Worldwide Interoperability for WiMax forum.

"Micro mobility" is defined as mobility that is anchored at a fixed IP gateway device. The mobile device is in the micro mobility domain as long as its IP gateway does not change as the mobile device moves location, even though mobile device may communicate with different base stations and/or the Backhaul Network Gateways (BNG) used to reach the IP gateway. WiMax's micro mobility solution requires a new control protocol that involves the base station and the access services network (ASN) gateway ("R2 and R4 interface," in WiMax terminology). "Macro mobility" is defined as mobility that allows a mobile node to move from one IP gateway to another while retaining its IP address. Existing macro mobility solutions use Mobile IP and extensions to Mobile IP, which have several limitations. Some existing macro mobility solutions include Client Mobile IP, Client Mobile IPv4, Proxy Mobile IPv4, Mobile IPv6, and Client Mobile IPv6.

Regardless of which standard a cellular service providers choose to adopt, each of the standards generally define a cellular network architecture in which a particular mobile device is associated with a specific gateway device and an anchor device. That is, upon initiating a packet-based data communication session, the mobile device is bound to both a gateway device and an anchor device within the cellular network architecture. Commonly, each gateway device is an IP gateway or other IP-enabled access router that is associated with one or more base stations proximate to the origin of the communication session. Through the transmission and relay capabilities of the base stations, each gateway device handles data session initiated by the mobile device and routes the IP communications to the packet-based networks. That is, the gateway device routes any data communication originated by the mobile device to the anchor device. This routing configuration involving a mobile device, gateway device, and an anchor device is referred to as "triangular routing."

The anchor device is typically a service-oriented IP-enabled router that stores policies and other information (collectively, a "subscriber context") that are specific to a particular mobile device. The subscriber context may define, for example, a level or quality of service, encryption keys, address information, multicast group memberships, and charging and accounting information to account for the services provided to the particular mobile device. The anchor device provides an "anchor" or a set location for subscriber-specific context information (referred to as "subscriber contexts") required to access the packet-based network continuously while the associated mobile devices move through the cellular network. The anchor device may mark, tag, or otherwise processes the data communication in accordance with the subscriber context and then route the data communication to the intended destination within the packet-based network. In some cellular architectures, the gateway device may be referred to as a "foreign agent" while the "anchor device" may be referred to as a "home agent."

While the above network architecture enables accurate charging and accounting, the continuous triangular routing of all data packets to the anchor device for a session may inject substantial delay into the delivery of the above described services and erode the quality of service provided to the mobile device. Thus, by associating the subscriber with a fixed anchor device, the above architectures inefficiently route traffic and likely cause delay in accessing the packet-based network and the services supported by the packet-based network. This deficiency may become particularly limiting as cellular base stations are upgraded to support higher transmission speeds because the added delay may form a bottleneck to achieving higher data transmission speeds and violate Quality of Service (QoS) agreements with the subscriber.

SUMMARY

In general, a new architecture for providing mobility for IP traffic is described built on Internet Protocol (IP)/Multiprotocol Label Switching (MPLS) technologies, such as Virtual Private Local Area Network (LAN) Service (VPLS), the Border Gateway Protocol (BGP) and BGP MPLS Layer 3 Virtual Private Networks (VPNs). The technologies encompassing this architecture are referred to herein as "Mobile MPLS." The architecture described herein addresses several shortcomings of existing IP mobility solutions. This architecture may be applicable to Third Generation (3G) IP data traffic, WiMax, LTE and any other wireless access technologies that provide IP-based services to mobile subscribers.

The Mobile MPLS architecture described herein consists of several building blocks that provide functionality for different aspects of cellular network mobility. One building block is network-based macro mobility in IP/MPLS networks. The macro mobility solution described herein is built on extensions to a routing protocol and VPNs. The techniques allow a routing protocol, such as the Border Gateway Protocol (BGP), to be extended in a manner that allows mobile subscriber VPN routes to be communicated between routing devices for providing network-based macro mobility. For example, BGP can be extended in a manner that allows reachability to a mobile subscriber to be announced along with a MPLS mobile VPN label. In this manner, the techniques allow for the advertisement of per-subscriber routing state and enable each member of the mobile VPN that imports this route to route traffic directly to the IP gateway device to which the mobile subscriber is connected, thereby bypassing the current anchor device of the mobile subscriber and avoiding triangular routing.

In accordance with the techniques described herein, a mobile subscriber VPN route advertisement is defined for a routing protocol, such as BGP. The mobile subscriber VPN route advertisement may, for example, be defined as network layer reachability information (NLRI) associated with an advertised route communicated through a network by a BGP message. Consequently, the defined mobile subscriber VPN route advertisement may be used by a routing device to encode mobile subscriber reachability information to direct other routing devices to control network traffic associated with the advertised route. The mobile subscriber VPN route advertisement may be defined in an extensible manner that allows a variable number of attributes to be specified. Moreover, the mobile subscriber VPN route advertisement may be defined in a manner that causes the encoded mobile subscriber reachability information to be treated as opaque BGP data. As a result, routers and other network devices that do not support the extension may ignore the encoded mobile subscriber reachability information.

One of the challenges in building a macro mobility solution is the tradeoff between optimal routing and mobile subscriber state. Efficient routing of packets destined to and from mobile subscribers typically requires per subscriber routing state in the network. Solutions such as Mobile IPv4 or Proxy Mobile IP may reduce this state at the cost of inefficient routing (triangular routing). The solution described herein allows the service provider (SP) to select between a triangular routing mode and an optimal routing mode, giving the flexibility to provide either efficient routing (i.e., shortest path routing) or avoid per subscriber state. Moreover, the embodiments described herein that are provided by this solution allow an SP to make such a decision on a per subscriber basis.

Another building block of the proposed network-based mobility architecture is a solution to the problem of transferring subscriber context between Mobile broadband remote access servers (BRASes) while preserving the IP address of the subscriber. When a mobile subscriber is associated with a BRAS, the BRAS may access a server (e.g., during authentication of the subscriber) to obtain subscriber context information such as policies or other information specific to the mobile subscriber. The BRAS then instantiates these policies in communicating with the mobile subscriber. When the mobile subscriber later moves to a second BRAS, a handoff of the authenticated session occurs to the second BRAS. However, the second BRAS is not aware of the subscriber context, because subscriber authentication has already taken place. The solution described herein provides a subscriber context transfer mechanism for mobile subscriber management that is built on extensions to a routing protocol such as BGP, and to BGP-MPLS Layer 3 VPNs. It is possible for a SP to deploy the context transfer mechanism described herein in conjunction with existing mobility solutions (e.g., Mobile IP). In other words, it is not necessary to deploy the network based mobility solutions described here in order to deploy the context transfer solution.

Another building block of the mobility architecture described herein is network-based micro mobility based on VPLS. One of the applications of this solution is in an IP/MPLS-based mobile backhaul network. Because cellular service providers are beginning to move towards IP/MPLS-based mobile backhaul networks for wireless technologies, the proposed micro mobility solution described herein may be particularly advantageous in defining the micro mobility solution for backhaul networks as based on IP/MPLS technologies such as L2VPNs, pseudowires (PWs), VPLS and L3VPNs. Embodiments of the micro mobility solution described herein are based on VPLS, and are particularly desirable in that they leverage the existing IP/MPLS technology that may be already used for backhaul networks.

The individual components of the mobility architecture described herein are independent but may also be used together. For example, a service provider can deploy VPLS for micro mobility and continue using existing Mobile IP for macro mobility. As another example, a service provider can deploy the L3VPN-based macro mobility and continue using LTE-based micro mobility.

The architecture described herein also offers multicast support for mobile subscribers. MPLS multicast technologies are used to provide support for multicast services to mobile subscribers. Specifically, VPLS multicast extensions can be leveraged when VPLS is used as the micro mobility solution. BGP Multicast VPNs can be leveraged for providing IP multicast services to mobile subscribers when the macro mobility solution based on BGP MPLS VPNs is used.

The techniques described herein also provide redundancy for various functional elements of the architecture. For example, the techniques may be used to provide redundancy between two or more Backhaul Network Gateways (BNGs). The techniques may also be used to provide redundancy between two or more IP Mobile Gateways. Finally, it is possible to provide redundancy between two or more Mobile broadband remote access servers (BRASes). The techniques for context transfer using an extended routing protocol are leveraged for providing such redundancy. The techniques described herein also provide inter-domain support based on BGP.

The embodiments described herein can be integrated with various wireless access technologies, including WiMax and LTE. In addition, a subset of the embodiments can be integrated with 3G for IP data traffic. The embodiments described herein provide Micro Mobility in a WiMax network that uses IP/MPLS for mobile backhaul by re-using, with extensions as required, the IP/MPLS mechanisms. For example, micro mobility may be provided by using Virtual Private LAN Service (VPLS) in the backhaul network. This embodiment eliminates the need to run a new WiMax control protocol in the backhaul network for Micro Mobility. Moreover, the embodiment allows the same control plane mechanism to be used for wireline and mobile services. The embodiment also allows for the same control plane to be used for IPv4 and IPv6.

In one embodiment, a method comprises receiving, with a gateway device of a cellular network, a request from a mobile device to connect to the gateway device to access a packet-based network, the mobile device in wireless communication with a base station associated with the gateway device. The method further includes selecting a mode with the gateway device for routing packets destined for the mobile device, wherein selecting the mode comprises selecting one of an optimal routing mode and a triangular routing mode, wherein the optimal routing mode allows unicast traffic destined for the mobile device to bypass a current anchor device for the mobile device and be routed directly to the gateway device, and wherein the triangular routing mode allows unicast traffic for the mobile device to be routed to the anchor device that tunnels the traffic to the gateway device. The method further includes, in accordance with the selected mode, the gateway device advertising a mobile subscriber (MS) virtual private network (VPN) route advertisement to one or more other network devices in the cellular network using an extended routing protocol, wherein the MS VPN route advertisement encodes reachability information associated with the mobile device connected to the gateway device.

In another embodiment, a gateway device of a cellular network comprises an interface configured to receive a request from a mobile device to connect to the gateway device to access a packet-based network, the mobile device in wireless communication with a base station associated with the gateway device, and a control unit configured to select a mode for routing packets destined for the mobile device by selecting one of an optimal routing mode and a triangular routing mode, wherein the optimal routing mode allows unicast traffic destined for the mobile device to bypass a current anchor device for the mobile device and be routed directly to the gateway device, and wherein the triangular routing mode allows unicast traffic for the mobile device to be routed to the anchor device that tunnels the traffic to the gateway device. The control unit is configured to execute a routing protocol that has been extended to advertise a mobile subscriber (MS) virtual private network (VPN) route advertisement to one or more other network devices in the cellular network, wherein the MS VPN route advertisement encodes reachability information associated with the mobile device connected to the gateway device.

In a further embodiment, a system comprises a first gateway device associated with a first base station, a second gateway device associated with a second base station, a mobile device in wireless communication with the first base station after being in wireless communication with the second base station; and an anchor device that acts as a main repository for a subscriber context associated with the mobile device. The first gateway device comprises an interface configured to receive a request from the mobile device to connect to the first gateway device to access a packet-based network, and a control unit configured to select one of an optimal routing mode and a triangular routing mode for routing packets destined for the mobile device, wherein the optimal routing mode allows unicast traffic destined for the mobile device to bypass a current anchor device for the mobile device and be routed directly to the gateway device, and wherein the triangular routing mode allows unicast traffic for the mobile device to be routed to the anchor device that tunnels the traffic to the gateway device. The control unit is configured to execute a routing protocol that has been extended to advertise a mobile subscriber (MS) virtual private network (VPN) route advertisement to one or more other network devices in a cellular network of the system, wherein the MS VPN route advertisement encodes reachability information associated with the mobile device connected to the gateway device.

In a further embodiment, a computer-readable storage medium comprises instructions for causing a programmable processor of a gateway device of a cellular network to receive a request from a mobile device to connect to the gateway device to access a packet-based network, the mobile device in wireless communication with a base station associated with the gateway device, and select one of an optimal routing mode and a triangular routing mode for routing packets destined for the mobile device, wherein the optimal routing mode allows unicast traffic destined for the mobile device to bypass a current anchor device for the mobile device and be routed directly to the gateway device. The triangular routing mode allows unicast traffic for the mobile device to be routed to the anchor device that tunnels the traffic to the gateway device. The instructions also cause the processor to, in accordance with the selected mode, advertise a mobile subscriber (MS) virtual private network (VPN) route advertisement to one or more other network devices in the cellular network using an extended routing protocol, wherein the MS VPN route advertisement encodes reachability information associated with the mobile device connected to the gateway device.

In another embodiment a method for routing packets within a network comprises establishing a data communication session between a cellular mobile device and a packet-based network via a first cellular base station and first gateway associated with the first cellular base station, wherein establishing the data communication session comprises binding the cellular mobile device to an anchor device associated with the first gateway and storing subscriber context for the cellular mobile device with the anchor device. The method further includes, after establishing the data communication session, receiving, with a second gateway device of a cellular network, a request from the cellular mobile device to connect to the second gateway device to access the packet-based network, and selecting a mode with the second gateway device for routing packets of the data communication session from the packet-based network to the mobile device, wherein selecting the mode comprises selecting between: (1) a first routing mode that allows the packets of the data communication session destined for the mobile device to bypass the anchor device and be routed directly to the second gateway device, and (2) a second routing mode that allows the packets of the data communication session to be routed to the anchor device that forwards the traffic to the second gateway device. The method also includes, upon selecting the first routing mode with the second gateway device, advertising a mobile subscriber (MS) virtual private network (VPN) route advertisement with the second gateway device to other network devices in the cellular network that are members of a mobile VPN associated with the second gateway device, wherein the MS VPN route advertisement encodes a full network address associated with the mobile device and a multiprotocol label switching (MPLS) mobile label for reaching the second gateway to which the mobile subscriber is connected. In addition, the method includes, upon selecting the triangular routing mode with the gateway device, advertising a targeted MS VPN route advertisement with the second gateway device to the anchor device in the cellular network to enable the anchor device to remain the anchor device and route packets destined for the mobile device to the second gateway device.

In another embodiment, a method comprises deploying a virtual private local area network service (VPLS) instance within a layer two (L2) backhaul network of a cellular network, wherein the L2 backhaul network is positioned between a mobile device and a gateway device connected to a packet-based wide area network (WAN), wherein the gateway device is configured as a member of the VPLS instance, and wherein the mobile device is in wireless communication with a base station associated with a backhaul element of the cellular network. The method also includes receiving, with the gateway device, an address resolution request from the mobile device, wherein the address resolution request is flooded by the VPLS instance, responding to the address resolution request, with the gateway device, with a media access control (MAC) address of the gateway device, identifying a first backhaul element of the cellular network through which a MAC address of the mobile device is reachable based on the received request, receiving Internet Protocol (IP) packets destined for the IP address of the mobile device, and forwarding the received IP packets to the identified backhaul element using the VPLS instance for communication to the mobile device. The gateway device of the cellular network is connected to a second base station reachable via a second backhaul element associated with the L2 backhaul network. The method also includes, upon movement of the mobile device from wireless communication with the first base station to wireless communication with the second base station, performing MAC address learning with the VPLS instance to detect that the MAC address for the mobile device is no longer reachable by the first backhaul element and is reachable by the second backhaul element. The method includes, in response to the MAC address learning, dynamically updating a stored location of the mobile device within the cellular network, subsequently receiving IP packets destined for the IP address of the mobile device, and forwarding the subsequently received IP packets to the second backhaul element using the VPLS instance for communication to the mobile device.

In yet another embodiment, a gateway device of a cellular network comprises a control unit configured to execute a virtual private local area network service (VPLS) instance, and an interface configured to receive an address resolution request from the mobile device, wherein the address resolution request is flooded by a member of the VPLS instance of which the gateway device is configured as a member. The control unit is configured to respond to the address resolution request with a media access control (MAC) address of the gateway device, and identify a first backhaul element of a layer two (L2) backhaul network of the cellular network through which a MAC address of the mobile device is reachable based on the received request, wherein the L2 backhaul network is positioned between a mobile device and a gateway device connected to a packet-based wide area network (WAN), and wherein the mobile device is in wireless communication with a base station associated with a backhaul element of the cellular network. The interface is configured to receive IP packets destined for the IP address of the mobile device, and forward the received IP packets to the identified backhaul element using the VPLS instance for communication to the mobile device. The gateway device is connected to a second base station reachable via a second backhaul element associated with the L2 backhaul network. The control unit is configured to perform MAC address learning with the VPLS instance to detect when the MAC address for the mobile device is no longer reachable by the first backhaul element and is reachable by the second backhaul element, and, in response to the MAC address learning, dynamically update a location of the mobile device within the cellular network. The interface is configured to receive subsequent IP packets destined for the IP address of the mobile device, and forward the subsequently received IP packets to the second backhaul element using the VPLS instance for communication to the mobile device.

In a further embodiment, a computer-readable storage medium comprises instructions for causing a programmable processor of a gateway device of a cellular network to execute a virtual private local area network service (VPLS) instance within a control unit of the gateway device, receive an address resolution request from the mobile device, wherein the address resolution request is flooded by a member of the VPLS instance of which the gateway device is configured as a member, respond to the address resolution request with a media access control (MAC) address of the gateway device, and identify a first backhaul element of a layer two (L2) backhaul network of the cellular network through which a MAC address of the mobile device is reachable based on the received request, wherein the L2 backhaul network is positioned between a mobile device and a gateway device connected to a packet-based wide area network (WAN), and wherein the mobile device is in wireless communication with a base station associated with a backhaul element of the cellular network, wherein the gateway device of the cellular network is connected to a second base station reachable via a second backhaul element associated with the L2 backhaul network. The instructions also cause the processor to receive IP packets destined for the IP address of the mobile device, forward the received IP packets to the identified backhaul element using the VPLS instance for communication to the mobile device, and, upon movement of the mobile device from wireless communication with the first base station to wireless communication with the second base station, perform MAC address learning with the VPLS instance to detect that the MAC address for the mobile device is no longer reachable by the first backhaul element and is reachable by the second backhaul element. The instructions cause the processor to, in response to the MAC address learning, dynamically update a stored location of the mobile device within the cellular network, subsequently receive IP packets destined for the IP address of the mobile device, and forward the subsequently received IP packets to the second backhaul element using the VPLS instance for communication to the mobile device.

In a further embodiment, a system comprises a layer two (L2) backhaul network within a cellular network in which a virtual private local area network service (VPLS) instance is deployed, a mobile device connected to the cellular network, in wireless communication with a base station, a first backhaul element of the L2 backhaul network associated with the base station, through which a media access control (MAC) address of the mobile device is reachable, and a first gateway device connected to a packet-based wide area network (WAN), wherein the L2 backhaul network is positioned between the mobile device and the first gateway device. The first gateway device of the system comprises a control unit configured to execute a VPLS protocol associated with the VPLS instance, and an interface configured to receive an address resolution request from the mobile device, wherein the address resolution request is flooded by a member of the VPLS instance of which the first gateway device is configured as a member, wherein the control unit is configured to respond to the address resolution request with a MAC address of the first gateway device, and identify the first backhaul element through which the MAC address of the mobile device is reachable based on the received request, wherein the interface is configured to receive IP packets destined for the IP address of the mobile device, and forward the received IP packets to the identified backhaul element using the VPLS instance for communication to the mobile device, wherein the gateway device is connected to a second base station reachable via a second backhaul element associated with the L2 backhaul network, wherein the control unit is configured to perform MAC address learning with the VPLS instance to detect when the MAC address for the mobile device is no longer reachable by the first backhaul element and is reachable by the second backhaul element, and, in response to the MAC address learning, dynamically update a location of the mobile device within the cellular network, and wherein the interface is configured to receive subsequently IP packets destined for the IP address of the mobile device, and forward the subsequently received IP packets to the second backhaul element using the VPLS instance for communication to the mobile device.

In another embodiment, a method comprises providing network-based micro mobility for a mobile device in a cellular network using an extended virtual private local area network service (VPLS), providing network-based macro mobility for the mobile device using an extended routing protocol to send virtual private network (VPN) routes that encode reachability information associated with the mobile device; and transferring subscriber context to other network devices in the cellular network using the extended routing protocol to encode the subscriber context.

In a further embodiment, a method comprises receiving, with a first network device of a cellular network, a request to initiate a data session between a mobile device and a packet-based computer network, the mobile device in wireless communication with a first base station associated with the first network device. The method also includes processing, with the first network device, data communications associated with the data session in accordance with a subscriber context associated with the mobile device, wherein the subscriber context specifies subscriber-specific information defining one or more policies that are applied to the data communications. In addition, the method includes, with the first network device, advertising a mobile subscriber (MS) virtual private network (VPN) route advertisement to other network devices in the cellular network using an extended routing protocol, wherein the MS VPN route advertisement encodes the subscriber context for the mobile device in accordance with the extended routing protocol to enable the other network devices to process the data communications associated with the data session in accordance with the subscriber context.

In yet another embodiment, a network device of a cellular network comprises an interface configured to receive a request to initiate a data session between a mobile device and a packet-based computer network, the mobile device in wireless communication with a first base station associated with the first network device, and a control unit configured to process data communications associated with the data session in accordance with a subscriber context associated with the mobile device, wherein the subscriber context specifies subscriber-specific information defining one or more policies that are applied to the data communications. The control unit is configured to execute a routing protocol that has been extended to advertise a MS VPN route advertisement to other network devices in the cellular network, wherein the MS VPN route advertisement encodes the subscriber context for the mobile device in accordance with the extended routing protocol to enable the other network devices to process the data communications associated with the data session in accordance with the subscriber context.

In an additional embodiment, a system comprises a first network device associated with a first base station, a second network device associated with a second base station, a mobile device in wireless communication with the first base station, and a third network device that stores a subscriber context associated with the mobile device. The first network device comprises an interface configured to receive a request from the mobile device to initiate a data session between the mobile device and a packet-based computer network; and a control unit configured to process data communications associated with the data session in accordance with the subscriber context associated with the mobile device, wherein the subscriber context specifies subscriber-specific information defining one or more policies that are applied to the data communications. The control unit is configured to execute a routing protocol that has been extended to advertise a MS VPN route to the second network device, wherein the MS VPN route advertisement encodes the subscriber context for the mobile device in accordance with the extended routing protocol to enable the second network device to process the data communications associated with the data session in accordance with the subscriber context.

In another embodiment, a computer-readable storage medium comprises instructions for causing a programmable processor of a first network device of a cellular network to receive a request to initiate a data session between a mobile device and a packet-based computer network, the mobile device in wireless communication with a first base station associated with the first network device, process data communications associated with the data session in accordance with a subscriber context associated with the mobile device, wherein the subscriber context specifies subscriber-specific information defining one or more policies that are applied to the data communications, and advertise a mobile subscriber (MS) virtual private network (VPN) route advertisement to other network devices in the cellular network using an extended routing protocol, wherein the MS VPN route advertisement encodes the subscriber context for the mobile device in accordance with the extended routing protocol to enable the other network devices to process the data communications associated with the data session in accordance with the subscriber context.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
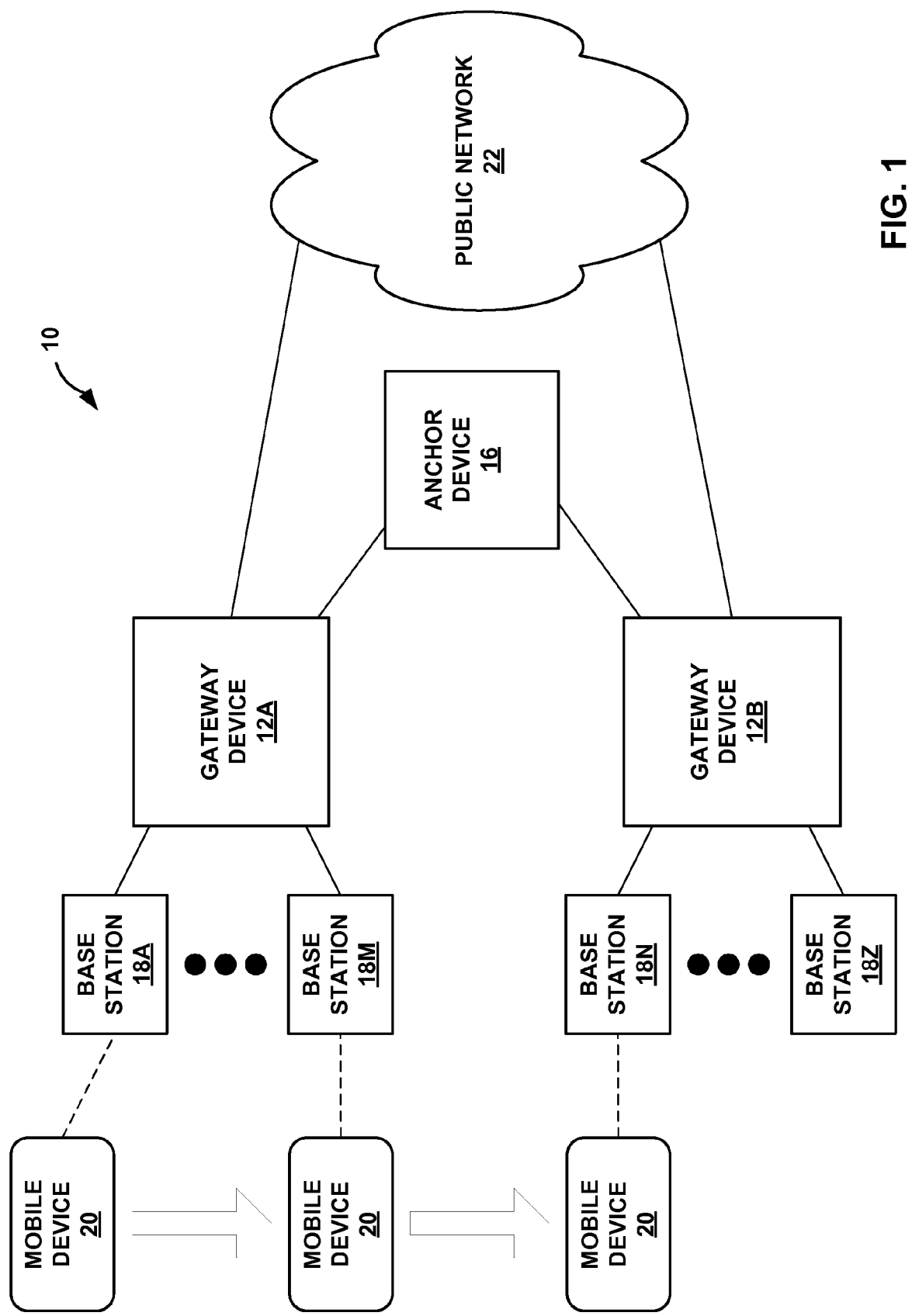
FIG. 1 is a block diagram illustrating a system that includes an example cellular network.

FIG. 1 is a block diagram illustrating a system that includes an example cellular network 10. As shown in FIG. 1, cellular network 10 includes gateway device 12A, 12B ("gateway devices 12"), as well as anchor device 16, base stations 18A-18Z ("base stations 18"), and a mobile device 20. In the example of FIG. 1, cellular network 10 couples to a packet-based public network 22, which may, for example, represent the Internet or any other packet-based, publicly accessible or private computer network. Mobile device 20 may also be referred to as a mobile subscriber. While shown for ease of illustration as including only two gateway devices 12, one anchor device 16, and one mobile device 20, cellular network 10 may comprise a plurality of gateway devices and a plurality of anchor devices that service a plurality of mobile devices. The invention therefore should not be limited to the exemplary embodiment depicted in FIG. 1.

Base stations 18 have radio connectivity with mobile device 20 on one side, and on the other side, base stations 18 interface to a backhaul network (not shown) of the cellular network 10. A Worldwide Interoperability for Microwave Access (WiMax) base station is an example of such a device. Gateway devices 12 may be Internet Protocol (IP) gateway devices that make up the IP edge for the mobile subscribers. Gateway devices 12 are the IP routers that either "own" the subnet to which the IP address of mobile device 20 belongs, or that route traffic to the IP router that "owns" the subnet. Example gateway devices are a Mobile IP Home Agent (HA) or a Mobile IP Foreign Agent (FA). Other example gateway devices in WiMax are the access services network (ASN) gateway or connectivity services network (CSN) gateway in WiMax. In some cases, IP gateway and mobile broadband remote access server (BRAS) functionality may be located on the same device, e.g., gateway devices 12. A Mobile BRAS provides subscriber management services to mobile subscribers, e.g., mobile device 20.

Cellular network 10 may also include one or more backhaul networks (not shown in FIG. 1). The backhaul networks connect the base stations 18 to the gateway devices 12. The backhaul networks are layer 2 networks (from a mobile subscriber's perspective) that provide connectivity from the base stations 18 to the gateway devices 12. Cellular network 10 may also include a Backhaul Network Gateway (BNG) (not shown). The BNG acts as the gateway between the Layer 2 Backhaul Network and the gateway devices 12. In some cases, the BNGs may be the same devices as the IP mobile Gateways, e.g., gateway devices 12.

In accordance with the principles of the invention, the techniques described herein provide a network-based macro mobility technique for a network such as cellular network 10 that uses IP/MPLS for wireline subscribers, by extending the existing IP/MPLS control plane of network 10. The network-based macro mobility technique described herein is built on extensions to a routing protocol such as BGP and VPNs such as Layer 2 VPNs or Layer 3 VPNs. This technique, referred to as Mobile MPLS, is access-independent in that the micro mobility technique described herein may be used in conjunction with WiMax, LTE, or other access technologies, and leverages the existing IP/MPLS control plane and data plane of the packet-based portion of network 10.

One advantage of the Mobile MPLS techniques described herein is that there is no need to run a separate control plane and data plane for micro mobility in an IP/MPLS mobile backhaul network. For example, a separate WiMax micro mobility control plane between a WiMax Base station and ASN gateway should not be necessary in an IP/MPLS-based mobile backhaul network. In this manner, the techniques described herein may avoid potential scaling limitations found in other techniques that lack control plane hierarchy and require periodic refresh of control plane messages, such as Mobile IP, Client Mobile IPv4 (CMIPv4) and Proxy Mobile IP (PMIP). The techniques may also avoid certain security issues that arise in inter-provider CMIPv4 and PMIP, which require direct peerings between the provider edge (PE) devices that are Home Agents (HAs) and Foreign Agents (FAs).

Mobile Subscribers belonging to a particular Mobile Provider are said to be part of a "Mobile VPN" which is defined by a set of Route-Targets, administered by the Mobile Provider. IP gateways and other provider edge (PE) devices that are in the macro mobility domain are part of the mobile VPN.

One of the challenges in building a macro mobility technique is the tradeoff between efficient routing and mobile subscriber state. To address this challenge, the macro mobility techniques described herein allows cellular network 10 to route mobile subscriber traffic in one of two modes, referred to as an "optimal routing" mode and a "triangular routing" mode. In the optimal routing mode, the techniques provide the ability for unicast traffic destined for mobile device 20 to be routed directly to the particular gateway device 12 to which mobile device 20 is currently connected, i.e., with which mobile device 20 is currently communicating. The techniques extend IP VPN routing mechanisms to perform optimal routing, also referred to herein as "Mobile Subscriber Routing," and thus giving the service provider the option to avoid triangular routing. Optimal routing allows an optimal path to be used for routing unicast traffic to mobile device 20. Use of the optimal routing mode may improve latency and bandwidth usage, but comes at the cost of increasing per subscriber routing state in the network, because optimal routing advertises full IP addresses for each mobile subscriber (/32 routing).

The techniques described herein also provide the service provider the option to rely on triangular routing and avoid per subscriber routing state for a particular mobile subscriber. When this option is used, unicast traffic for mobile device 20 is routed to a Layer 3 Anchor Point (LAP), e.g., anchor device 16. Anchor device 16 learns of the current gateway device 12 that the mobile device 20 is connected to and tunnels the traffic to the gateway device 12 using IP or MPLS tunnels. Anchor device 16 announces to the rest of cellular network 10 the reachability of all mobile subscribers that are using anchor device 16 as the anchor point for triangular routing. There can be multiple LAPs in cellular network 10, each for a set of mobile subscribers. Further, the techniques support LAP failure redundancy.

Efficient routing of packets destined to and from mobile subscribers typically requires per subscriber routing state in cellular network 10. Other solutions such as Mobile IPv4 or Proxy Mobile IP reduce this per subscriber routing state at the cost of inefficient routing (triangular routing). The techniques described herein allow the service provider (SP) flexibility to provide either efficient routing or avoid per subscriber state by relying on triangular routing. The tools provided by the techniques described herein allow a SP to make such a decision on a per subscriber basis. The techniques described herein also provide aggregation of mobile subscriber state across autonomous systems (ASes). Each AS border router (ASBR) aggregates the mobile subscriber routes belonging to subnets that are "owned" by the AS, while advertising them to other ASes. Depending on the mobile subscriber location this approach may still provide efficient routing while not propagating the mobile subscriber state across ASes. The techniques described herein also support multicast for mobile subscribers by using the mechanisms of BGP-MVPN, as described in further detail below.

The techniques allow a routing protocol, such as the Multiprotocol Border Gateway Protocol (MP-BGP), to be extended in a manner that defines a new type of BGP advertisement, and allows these BGP advertisements, called mobile subscriber VPN route advertisements, to be communicated between routing devices for providing network-based macro mobility. The extensions to BGP allow reachability to a mobile subscriber to be announced, e.g., an IP address of the mobile subscriber, a route distinguisher for the mobile VPN, and a MPLS mobile VPN label. In this manner, the techniques allow for the advertisement of per-subscriber routing state and enable each member of the mobile VPN that imports this route to route traffic directly to the IP gateway device to which the mobile subscriber is connected.

The mobile subscriber VPN route advertisement may, for example, be defined as network layer reachability information (NLRI) associated with an advertised route. Consequently, the mobile subscriber VPN route advertisement may be used to encode mobile subscriber reachability information to direct other routing devices to control network traffic associated with the advertised route. The mobile subscriber VPN route advertisement is defined in an extensible manner that allows a variable number of attributes to be specified. Moreover, the mobile subscriber VPN route advertisement may be defined in a manner that causes the encoded mobile subscriber reachability information to be treated as opaque BGP data. As a result, routers and other network devices that do not support the extension ignore the encoded mobile subscriber reachability information.

Figure 2:
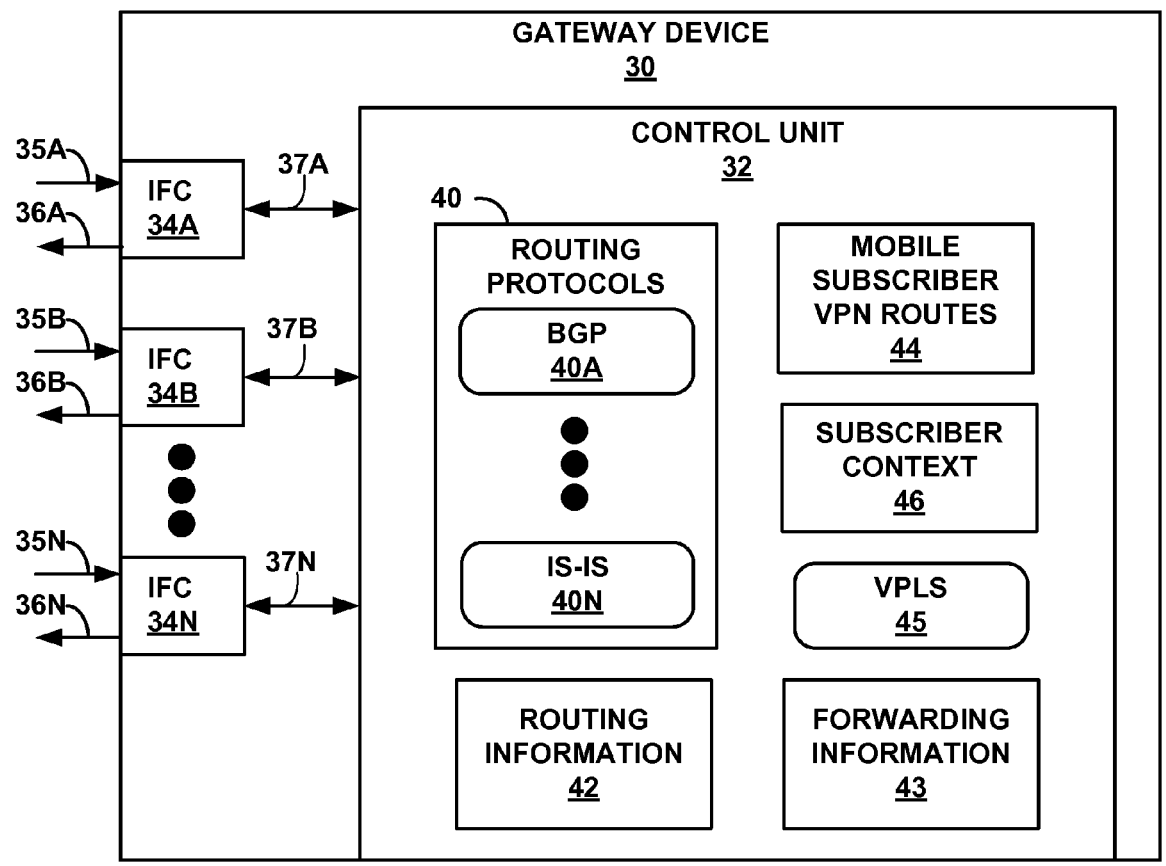
FIG. 2 is a block diagram illustrating an exemplary embodiment of a gateway device of the cellular network in further detail.

FIG. 2 is a block diagram illustrating an exemplary embodiment of a gateway device 30 in further detail. Gateway device 30 may comprise a router, a switch, a hub or any gateway device capable of implementing the techniques described herein. For example, gateway device 30 may be one of gateway devices 12 of FIG. 1.

In the illustrated embodiment, router 10 includes interface cards 34A-34N (collectively, "IFCs 34") that receive and send packet flows via inbound network links 35A-35N (collectively, "inbound network links 35") and outbound network links 36A-36N (collectively, "outbound network links 36"), respectively. IFCs 34 are typically coupled to inbound network links 35 and outbound network links 36 via a number of interface ports (not shown), and forward and receive packets and control information from control unit 32 via a respective one of paths 37A-37N (collectively, "paths 37"). Gateway device 30 may include a chassis (not shown) having a number of slots for receiving a set of cards, including IFCs 34. Each card may be inserted into a corresponding slot of a chassis for communicably coupling the card to a control unit 32 via a bus, backplane, or other electrical communication mechanism.

Control unit 32 comprises routing protocols 40A-40N (collectively, "routing protocols 40"), routing information 42, and forwarding information 43. Routing protocols 40 represent a set of routing protocols implemented via control unit 32, e.g., via one or more software processes. Gateway device 30 exchanges routing information 42 with other routing devices by sending and receiving network communications in accordance with routing protocols 40, thereby learning the topology of the network and, more specifically, routes to other network devices within the network. Routing protocols 40 may include exterior routing protocols to exchange routing information 42 with routers of other domains or autonomous systems, e.g. via the BGP routing protocol 40A. In addition, or alternatively, routing protocols 40 may include interior routing protocols, e.g., the IS-IS routing protocol 40N, to learn of "internal" routes, i.e., routes to destinations within the same network as gateway device 30.

Control unit 32 includes a programmable microprocessor, memory, storage media and interconnected hardware necessary to store data and/or execute software instructions for routing protocols 40, routing information 42, forwarding information 43, mobile subscriber VPN routes 44, VPLS 45, and subscriber context 46. The architecture of gateway device 30 illustrated in FIG. 2 is for exemplary purposes only, and the principles of the invention are not limited to this architecture. Control unit 32 may operate according to executable instructions fetched from one or more computer-readable storage media. Examples of such media include random access memory (RAM), read-only memory (ROM), non-volatile random access memory (NVRAM), electrically erasable programmable read-only memory (EEPROM), flash memory, and the like. The functions of gateway device 30 may be implemented by executing the instructions of the computer-readable storage medium with one or more processors, discrete hardware circuitry, firmware, software executing on a programmable processor, or a combination of any of the above.

Control unit 14 receives routing information 42 from other routing devices in accordance with routing protocols 40. Based on routing information 42, control unit 32 generates forwarding information 43 that associate destination information, such as IP address prefixes, with specific forwarding next hops (FNHs) and corresponding interface ports of IFCs 34. Forwarding information 43 may, therefore, be thought of as based on the information contained within routing information 42. Control unit 32 maintains routing information 42 and forwarding information 43 in the form of one or more tables, databases, link lists, radix trees, databases, flat files, or any other data structures.

In accordance with the principles of the invention, gateway device 30 may utilize one or more routing protocols 40 to distribute mobile subscriber VPN route advertisements using mobile subscriber VPN routes 44 when gateway device 30 operates in an optimal routing mode. BGP protocol 40A may, for example, be extended to advertise a new type of BGP advertisement to distribute the mobile subscriber VPN routes. The extension may involve defining a new sub-address family identifier (SAFI) that identifies a BGP route advertisement as a mobile subscriber VPN route advertisement. The extension to the BGP protocol allows distribution of mobile subscriber VPN routes for reaching a mobile device 20. In one example embodiment, BGP protocol 40A may comprise an extended multiprotocol-BGP (MP-BGP) protocol. BGP protocol 40A may also be extended to allow targeted mobile subscriber VPN routes to be distributed by the gateway device 30 to an anchor device 16 when gateway device 30 operates in a triangular routing mode. The targeted mobile subscriber VPN routes enable the anchor device 16 to learn the particular gateway device 30 that the mobile subscriber is connected to in order to tunnel packets destined for the mobile device 20 to the gateway device.

The mobile subscriber VPN route advertisement is defined in accordance with one of routing protocols 40, e.g., BGP 40A, so that the mobile subscriber VPN route advertisement is advertised according to the protocol. In one embodiment, the mobile subscriber VPN route advertisement includes information elements that are defined as network layer reachability information (NLRI) that is communicated in accordance with BGP protocol 40A when advertising the mobile subscriber VPN route advertisement.

Figure 3A:
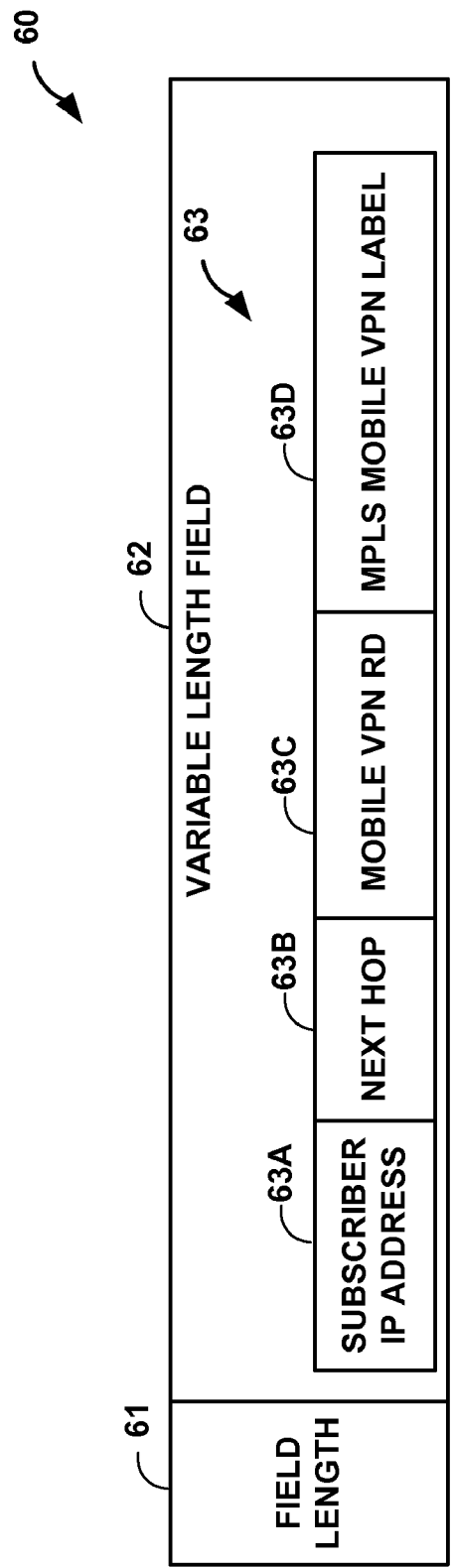
FIG. 3A is a block diagram illustrating an example data type that may be included within a mobile subscriber VPN route distributed by the gateway device using an extended routing protocol.

FIG. 3A is a block diagram illustrating an example data type 60 that may be included within a mobile subscriber VPN route advertisement distributed by gateway device 30 using an extended routing protocol such as BGP protocol 40A. For example, the information elements may be encoded in a variable length field 62 of the mobile subscriber VPN route advertisement distributed by BGP 40A of gateway device 30 as a BGP routing protocol message. In the illustrated embodiment, data type 60 is encoded as a two-byte field length value 61 followed by a variable length field 62. Field length value 61 specifies the length of field 62, which may vary depending on how many information elements are encoded within field 62. Example information elements that may be included are an IP address of the mobile subscriber, a mobile subscriber identifier that is assigned at authentication of the mobile subscriber, a next hop of the mobile subscriber (in some cases, e.g., a gateway device that originates the mobile subscriber VPN route advertisement), a route-distinguisher (RD) of the mobile VPN, an MPLS mobile VPN label for tunneling VPN traffic associated with the mobile device to the gateway device to which the mobile device is now attached, or other information. In one embodiment, field 62 includes any number of field elements 63, such a mobile subscriber IP address 63A, a next hop 63B, a mobile VPN RD 63C, and an MPLS mobile VPN label 63D. Other information elements not shown may also be encoded within the mobile subscriber VPN route advertisement.

Various approaches may be applied for assigning the MPLS mobile VPN labels. For example, MPLS mobile VPN labels may comprise a label that is assigned on a per-prefix basis (e.g., per-mobile subscriber). As another example, the MPLS mobile VPN labels may comprise a label that is assigned per next hop towards the gateway device, e.g., per customer edge device. As a further example, the MPLS mobile VPN labels may comprise a label that is assigned per virtual routing and forwarding (VRF) table. In this example, a device receives a mobile subscriber VPN route advertisement, does look-up in its VRF table to determine the interface on which to output the mobile subscriber VPN route advertisement, and outputs the mobile subscriber VPN route advertisement on this interface.

In one example embodiment, the information elements may be encoded within an L3VPN unicast NLRI. In other example embodiments, a new subsequent address family identifier (SAFI) may be defined that provides information about the information elements carried as NLRI. Moreover, the information elements may be defined in a manner that causes the information elements to be treated as opaque BGP data. As a result, routers and other network devices that do not support the extension ignore the encoded information elements when communicated by BGP protocol 40A.

Gateway device 30 may distribute the mobile subscriber VPN routes 44 via mobile subscriber VPN routes using MP-BGP, and may reuse L3 VPN mechanisms such as Route-Targets (RTs). The RT carried in the mobile subscriber VPN route advertisement has semantics such that this route advertisement is to be propagated to all the members of the mobile VPN in the autonomous system.

Gateway device 30 distributes the mobile subscriber VPN route advertisement to all the other members of the mobile VPN. The mobile subscriber VPN route advertisement provides per-subscriber routing state and enables each member of the mobile VPN that imports the route from this advertisement to route traffic directly to gateway device 30 to which the mobile subscriber is connected. This allows the service provider to elect to replace triangular routing at the cost of introducing per-subscriber routing state. The gateway device (e.g., gateway device 30) that outputs the extended routing protocol message to announce the mobile subscriber VPN route becomes the new anchor device for the mobile subscriber. In this case, therefore, the anchor device is the same device as the gateway device to which the subscriber is connected, unlike the triangular routing case.

A second building block employed by gateway device 30 is the mechanism to provide triangular routing as an option that can be selected by the service provider. A gateway device 30 to which a mobile subscriber connects is not required to originate a mobile subscriber VPN route to all PEs in the Mobile VPN for that mobile subscriber. Instead a service provider associated with gateway device 30 may decide to use triangular routing for the mobile subscriber. The service provider may, for example, decide which mode to use based on Service Level Agreements (SLAs) associated with the mobile subscriber. For example, the service provider may choose one mode for mobile subscribers having one type of SLA and another mode for mobile subscribers having a different type of SLA and may configure gateway device 30 accordingly.

In the triangular routing case, the anchor device is not the same device as the gateway device for the mobile subscriber, but rather a separate device. In this case, gateway device 30 updates the anchor device with the knowledge that packets for the mobile subscriber are to be routed to the gateway device 30. The anchor device is the next-hop to the best BGP route for the mobile subscriber. To update the Anchor Point, gateway device 30 originates a "Targeted Mobile VPN route" advertisement in accordance with the techniques described herein. The information elements in this route advertisement may be the same as those of the data type 60 of the mobile subscriber VPN route advertisement described above. However the route-target in this case is an IP-based route-target which is constructed from the IP address of the anchor device. This mobile subscriber VPN route is imported only by the anchor device having that IP address, which auto-configures this route-target as an import route-target. This enables the anchor device to learn the gateway device 30 that a mobile subscriber is connected to by way of the VPN route advertisement described herein and tunnel packets destined for the mobile subscriber to the gateway device 30 that announced the mobile subscriber VPN route advertisement. For example, the anchor device and the gateway device may establish the tunnels as IP or MPLS tunnels. A gateway device 30 that announces mobile subscriber VPN routes may aggregate reachability to multiple mobile subscribers in one route advertisement when possible. This may reduce the per subscriber routing state in the network.

The mobile subscriber VPN route advertisements and targeted mobile subscriber VPN route advertisements provide gateway device 30 (and hence a service provider) with the flexibility to trade off between efficient subscriber routing at the cost of per-subscriber state in the network and triangular routing. This tradeoff can be made on a per subscriber basis.

Additionally or alternatively, BGP protocol 40A may be extended in a manner that allows subscriber context information to be conveyed to and received from other network devices so that the subscriber context information is available to the new gateway device when a handoff of a mobile device 20 occurs from one gateway device to another. As described herein, the routing protocol extension allows a variable number of subscriber context information elements to be specified and communicated to other routing devices as opaque data within a routing message. For example, a level or quality of service, QoS scheduling, rate-limiting, policing parameters, encryption keys, address information, per-flow classifiers/filters, multicast group memberships, charging and accounting information to account for the services provided to the particular mobile device, and/or other subscriber context may be specified in accordance with the techniques described herein.

In order to convey subscriber context 46, a subscriber context data type is described herein for encoding subscriber context. The subscriber context data type may, for example, be defined in accordance with one of routing protocols 40, e.g., BGP 40A, so that the encoded subscriber context may be associated with routes advertised according to the protocol. In this manner, when sharing routing information 42 with other routers, control unit 32 may readily encode subscriber context and communicate the subscriber context with the routing information.

For example, in one embodiment, the subscriber context data type is defined as network layer reachability information (NLRI) that is readily communicated as opaque data within a routing advertisement in accordance with BGP protocol 40A when advertising routes. Moreover, the subscriber context data type may be defined in a manner that causes the subscriber context to be treated as opaque BGP data. As a result, routers and other network devices that do not support the extension ignore the encoded subscriber context when communicated by BGP protocol 40A.

Applying these techniques to an existing routing protocol (such as BGP) leverages use of the existing infrastructure for the protocol, such as the protocol algorithms, operational experience, and administrative processes, such as inter-provider peering agreements. In short, the techniques use an already-established communications infrastructure. Consequently, deployment of the techniques described herein may be accelerated by utilization of these existing systems. The established communications infrastructure includes an internal route distribution infrastructure, and external relationships, such as inter-domain BGP sessions to a customer network.

Figure 3B:
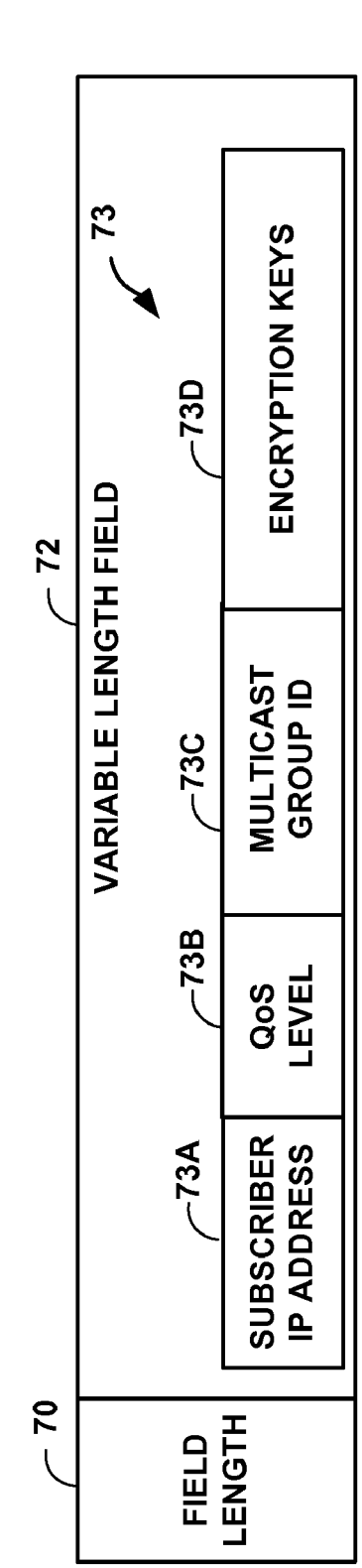
FIG. 3B illustrates an exemplary subscriber context data type defined for encoding subscriber context within a routing communication according to a routing protocol that is extended as described herein.

FIG. 3B illustrates an exemplary subscriber context data type 70 defined for encoding subscriber context 46 (FIG. 2) within a routing communication according to a routing protocol that is extended as described herein. For example, subscriber context data type 70 may be encoded within a BGP routing communication distributed by BGP 40A of gateway device 30. In the illustrated embodiment, subscriber context data type 70 is encoded as a two-byte field length value 71 followed by a variable length field 72. Field length value 71 specifies the length of field 72, which varies in one embodiment, depending on how many elements of subscriber context are encoded within field 72. Example subscriber context that may optionally be included are a subscriber IP address, a level or quality of service, QoS scheduling, rate-limiting, policing parameters, encryption keys, address information, per-flow classifiers/filters, multicast group memberships, charging and accounting information to account for the services provided to the particular mobile device, or other subscriber context. In one embodiment, field 72 includes any number of field elements 73, such as subscriber IP address 73A, QoS level 73B, multicast group ID 73C, and encryption keys 73D (collectively, "elements 73"). Other field elements 73 beyond those shown may also be included.

Figure 4:
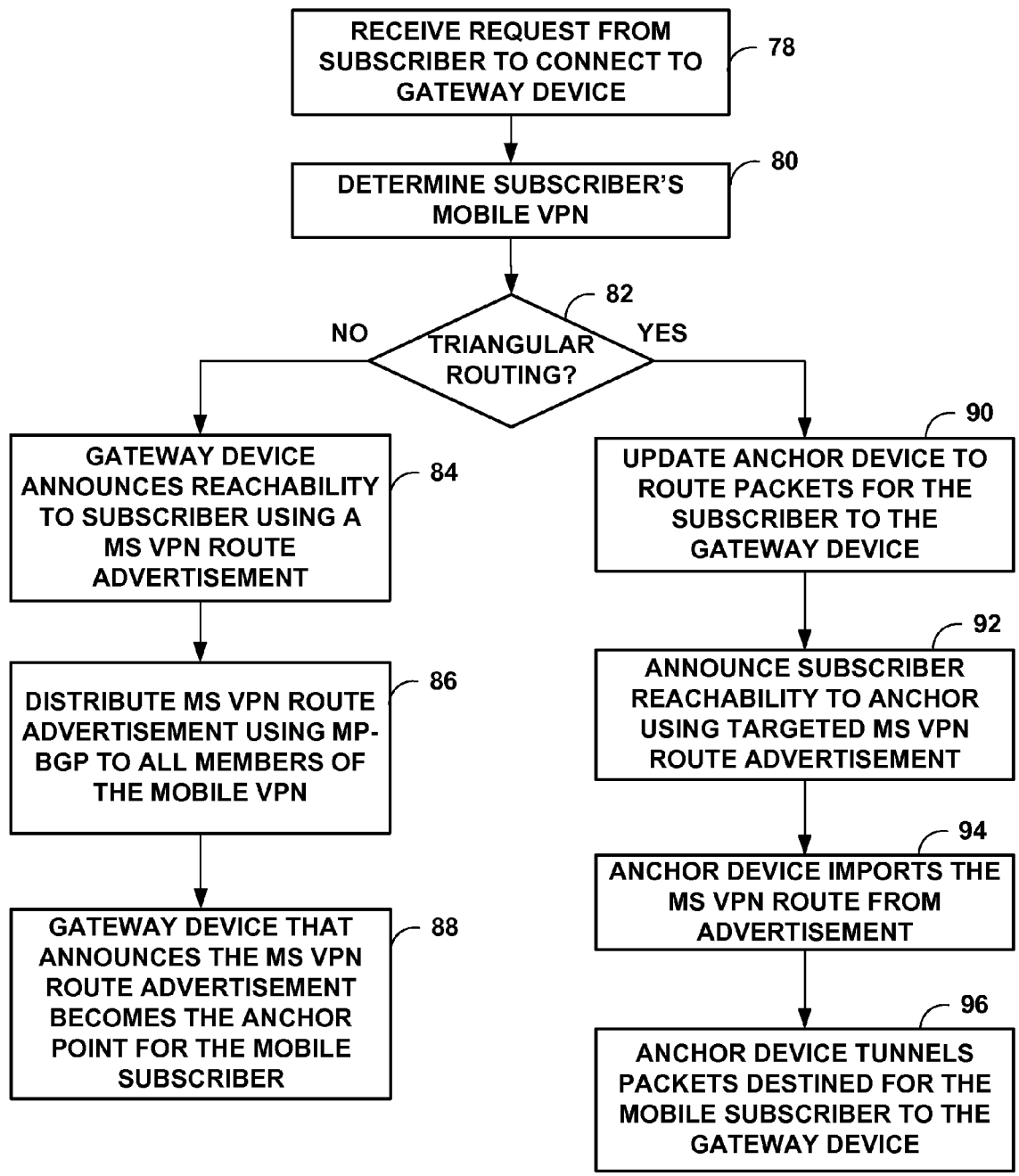
FIG. 4 is a flowchart illustrating example operation of a gateway device that operates in accordance with the principles of the invention.

FIG. 4 is a flowchart illustrating example operation of a gateway device that operates in accordance with the principles of the invention. For exemplary purposes, FIG. 4 will be explained in reference to FIGS. 1-2 and, in particular, gateway devices 12 and 30. Gateway device 12B receives a request from mobile device 20 (i.e., a mobile subscriber) to connect to gateway device 12B (78). This may occur, for example, when mobile device 20 moves from base station 18M, where gateway device 12A is the gateway to public network 22, to base station 18N, where gateway device 12B is the gateway to public network 22. When mobile device 20 no longer connects to gateway device 12A but instead has moved to a location wherein the mobile device attempts to establish network connectivity and data service via gateway device 12B, gateway device 12B needs to authenticate the subscriber in the context of the mobile network and determine the Mobile VPN to which mobile device 20 belongs (80). Gateway device 12B may determine the Mobile VPN using various mechanisms, many of which rely on using the identity of mobile device 20 to determine the Mobile VPN. For example, gateway device 12 B may determine the identity of mobile device 20 by the physical or virtual interface or interconnect used by mobile device 20 to associate with the gateway device 12B, or gateway device 12B may determine the identity of mobile device 20 based on the result of a dynamic authentication procedure that gateway device 12B uses to authenticate mobile device 20.

Next, a service provider configuring gateway device 12B may choose between using an optimal routing mode and a triangular routing mode for routing packets associated with mobile device 20. For example, gateway device 12B may be configured to use optimal routing instead of triangular routing if latency and bandwidth conservation are of concern to the service provider and efficient routing is desired. In one embodiment, gateway device 12B is configured to automatically select the appropriate routing mode based on a Service Level Agreement (SLA) associated with the mobile subscriber. For example, gateway device 12B may be configured with a policy that allows the gateway device 12B to automatically select from between the optimal routing mode and the triangular routing mode depending on a level of service associated with a particular mobile subscriber. Gateway device 12B may determine the level of service of the mobile subscriber using Remote Authentication Dial-In User Service (RADIUS) (e.g., by accessing a RADIUS server). As another example, gateway device 12B may perform deep packet inspection (DPI) to determine a type of application being used by the mobile subscriber, and can select from between the two modes based on the application. For example, if gateway device 12B determines by DPI that the mobile subscriber is using a Voice over IP call application, gateway device 12B may be configured to select the optimal routing mode.

If gateway device 12B will not use triangular routing for mobile device 20 (NO branch of 82) but rather chooses to use optimal routing, gateway device 12B announces to other gateway devices reachability to mobile device 20 using a mobile subscriber VPN route ("MS VPN route") (84). As described above, gateway device 12B distributes the MS VPN route using a routing advertisement conforming to a routing protocol such as MP-BGP to all members of the mobile VPN (86). The route advertisement carries the NO_EXPORT community ensuring that it is not advertised outside the AS.

The mobile subscriber VPN route advertisement may include information elements such as the IP address of mobile device 20, identification of the next hop used to reach mobile device 20 (here, gateway device 12B), the mobile VPN route-distinguisher (RD), an MPLS mobile VPN label, or other information elements.

If gateway device 12B is also the DHCP server used by mobile device 20 to obtain its IP address, then gateway device 12B already knows the IP address of mobile device 20. If this is not the case, gateway device 12B determines the current IP address of mobile device 20. This can be determined as a result of gateway device 12B authenticating mobile device 20, i.e., when gateway device 12B determines the identity of mobile device 20.

The mobile subscriber VPN route advertisement distributed by gateway device 12B provides per-subscriber routing state and enables each member of the mobile VPN that imports this route to route traffic directly to gateway device 12B to which mobile device 20 is connected. This replaces triangular routing at the cost of introducing per-subscriber routing state. Gateway device 12B becomes the anchor device for mobile device 20 (88). In this case, therefore, the anchor device is the same device as the gateway device to which mobile device 20 is connected, unlike the triangular routing case.

Gateway device 12B may, alternatively, be configured to use triangular routing for mobile device 20 instead of optimal routing. For example, a service provider may configure gateway device 12B to use triangular routing if the service provider prefers to avoid per-subscriber routing state in cellular network 10. If gateway device 12B uses triangular routing for mobile device 20 (YES branch of 82), gateway device 12B updates the current anchor device (e.g., anchor device 16) with the knowledge that packets for mobile device 20 must be routed to gateway device 12B instead of to gateway device 12A (90). The anchor device is the next-hop to the best BGP route for mobile device 20. To update anchor device 16, gateway device 12B originates a targeted Mobile VPN route advertisement that announces reachability to mobile device 20 (92). The information elements in this route advertisement may be the same as those of the data type 60 of the mobile subscriber VPN route advertisement described above with respect to FIG. 3A. However the route-target in this case is an IP-based route-target which is constructed from the IP address of anchor device 16. Thus, this mobile subscriber VPN route is imported only by anchor device 16 (94), which auto-configures this route-target as an import route-target. In this manner, anchor device 16 learns of the current gateway device 12 to which the mobile device 20 is connected. Anchor device 16 tunnels the traffic destined for the mobile device 20 to the gateway device 12 using IP or MPLS tunnels (96). Anchor device 16 announces to the rest of cellular network 10 the reachability of all mobile subscribers that are using anchor device 16 as the anchor point for triangular routing.

A gateway device that announces a mobile subscriber VPN route advertisement, such as gateway device 12B, may aggregate reachability to multiple mobile subscribers in one route when possible. This may reduce the per subscriber routing state in cellular network 10.

Mobile subscribers in a Mobile VPN need to be able to send and receive packets to/from destination addresses that are not in the Mobile VPN. The most common case for the destinations is to be in the Internet, i.e., in public network 22. This may be achieved by using the Internet access mechanisms of IP VPNs, which require the route to the destination to be determined from the Internet routing table if it is not in the virtual routing and forwarding (VRF) table. Similarly, the Internet access mechanisms of IP VPNs require packets received over the Internet to be routed using the Mobile VPN based on policies. The Internet access mechanisms may also be used for a mobile subscriber in one mobile service provider to connect to a mobile subscriber in another mobile service provider. This is described further below.

Considerations for inter autonomous system interactions will now be discussed. In many cases, it may be beneficial for per-subscriber routing state to be limited to a single autonomous system (AS). Thus, in some embodiments the mobile subscriber VPN route advertisements are not propagated outside an AS by default. Instead, an autonomous system border router (ASBR) advertises an aggregate Mobile VPN route advertisement, in external BGP (EBGP), having a route that summarizes reachability to all mobile subscribers on subnets owned by gateway devices in the AS. The "Home AS" of a mobile subscriber (MS) is the AS belonging to the gateway device which owns the mobile subscriber's subnet. If a gateway device to which a MS connects determines that the subnet of the MS is in another AS, then the gateway device should not advertise a mobile subscriber VPN route advertisement.

As long as the MS is in the same AS, this means that unicast traffic to the MS is first tunneled to an ASBR in this AS. The ASBR can then tunnel this traffic to the gateway device the MS is connected to (in the case of per-subscriber routing) or to the anchor device (in the case of triangular routing). Thus if the MS is in the same AS, summarization by an ASBR does not impact routing efficiency.

However, if macro mobility is desired across multiple ASes (e.g., in the case that the mobile VPN spans multiple ASes), the techniques automatically fall back to triangular routing if the MS moves outside its AS. In this case the unicast traffic, originated outside the home AS, destined to the subscriber is first tunneled to an ASBR in the home AS. The ASBR then tunnels this traffic to the gateway device, in another AS, that the MS is connected to.

Note that the gateway device (outside the home AS) that the subscriber is connected to sends a Targeted Mobile VPN route to the ASBR which acts as the anchor device. Optionally a gateway device that a MS is connected to may advertise a MS VPN route for the gateway device, even if the subnet of the MS belongs to another AS. In this case the ASBRs of this non-home AS may propagate this route in EBGP.

One mechanism to provide inter-provider connectivity is to use inter-provider IP VPN mechanisms such as Inter-AS Option A, Option B, or Option C. For further details on Inter-AS Option A, Option B, and Option C, see Rosen, E. C., "BGP/MPLS IP VPNs," draft-ietf-l3vpn-rfc2547bis-03.txt, October 2004, the entire contents of which is incorporated by reference herein. This is possible if the providers concerned are all using Mobile VPN mechanisms. If one of the providers is using Mobile IP instead then Mobile IP needs to be interworked with Mobile VPN mechanisms.

Turning to another aspect of the macro mobility approach, the techniques described herein for macro mobility also leverage BGP-MVPN for mobile multicast. First consider a mobile device 20 that is receiving a multicast stream from a wireline source. When the mobile device 20 connects to gateway device 12, the gateway device 12 receives a multicast join request from the mobile device 20. This could be an IGMP join. The gateway device 12 follows BGP MVPN procedures to propagate this state towards a PE (in the mobile VPN) that it picks as the Upstream Multicast Hop (UMH) for the wireline source. The gateway device 12 receives multicast traffic from the UMH. The rate of join/prunes of multicast state for a mobile device 20 is determined by the rate at which a mobile device 20 moves from one gateway device 12 to another.

In another scenario, mobile device 20 may be a multicast source. In this case other PEs with MSes that wish to receive this traffic send their c-multicast routes to the gateway device 12 that mobile device 20 is connected to (for per subscriber routing) or to the anchor device 16 (for triangular routing). When triangular routing is used the anchor device 16 propagates the c-multicast route to the gateway device 12 that mobile device 20 is connected to. The gateway device 12 that mobile device 20 is connected to sends the multicast traffic on either I-PMSI or S-PMSI. Note that even though the c-multicast routes, in the case of triangular routing, are propagated via the anchor device 16 the data traffic does not necessarily flow via the anchor device 16.

The proposed macro mobility approach also addresses issues related to fast handoff. In the case of Per-MS VPN routing, when mobile device 20 moves from gateway device 12A to gateway device 12B, the new gateway device 12B originates a mobile subscriber VPN route advertisement. Until this route advertisement is received and processed by other network elements in cellular network 10 and their forwarding state updated, the network elements continue to forward traffic to the old gateway device 12A. In the absence of extra mechanisms the handoff duration is the time required for all network elements to complete their forwarding updates as the old gateway device 12A drops the traffic. This time can be in the order of seconds.

Several approaches for enabling a fast handoff are proposed herein as part of the macro mobility techniques. A first approach to reducing this handoff time is to let the old gateway device 12A tunnel traffic to the new gateway device 12B if: (1) the old gateway device 12A receives traffic destined to the MS and (2) the old gateway device 12A has received the mobile subscriber VPN route advertisement from the new gateway device 12B. This can occur if the old gateway device 12A receives and processed this route before the other network elements. This approach is likely to reduce the handoff time, especially if the propagation of the mobile subscriber VPN route advertisement to the old gateway device 12A is optimized.

A second approach to reducing this handoff time is to create the concept of a "Handoff IPGW-zone (HIZ)." For a particular IP Gateway (IPGW) the HIZ is the set of IPGWs in the geographical vicinity of the gateway device 12 that a mobile device 20 is likely to move to. The HIZ is configured on a particular gateway device 12. When an old gateway device 12 receives traffic for a particular mobile device 20, it may tunnel this traffic to all the other IPGWs in the HIZ with the assumption that the MS has moved to one of them (even if the old gateway device 12 has not received the mobile subscriber VPN route advertisement from the new gateway device 12). If the new gateway device 12 is in the HIZ, it forwards this traffic while the other IPGWs drop the traffic. A point-to-multipoint (P2MP) LSP can be used by the old gateway device 12 for the tunneling the traffic, where the old gateway is the single source of the P2MP tunnel and the set of IPGWs to which the mobile device 20 is likely to move are the egress devices. U.S. patent application Ser. No. 11/212,509, entitled AGGREGATE MULTICAST TREES FOR MULTICAST VIRTUAL PRIVATE NETWORKS, describes techniques for establishing P2MP tunnels, the entire contents of which is incorporated herein by reference.

Multiple Mobile VPNs can use the same P2MP LSP for this tunneling with the aid of an upstream assigned label for demultiplexing a Mobile VPN. For example, the old gateway may allocate different inner labels for tunneling traffic for different Mobile VPNs to the set of IPGWs over the same P2MP LSP using the same outer label indicative of the P2MP LSP. This approach is likely to significantly reduce the handoff time and potentially reduce it to the order of 10s or 100s of milliseconds. The cost involved is the extra bandwidth consumed when the old gateway device 12 tunnels the traffic to the HIZ. In other words, there is a tradeoff between fast handoff times and bandwidth utilization.

In the case of triangular routing, when mobile device 20 moves from gateway device 12A to gateway device 12B, all network elements continue to send traffic to the anchor device 16. The new gateway device 12B generates a Targeted Mobile VPN route advertisement to the anchor device 16. Hence in the absence of extra mechanisms the handoff duration is the time required for the anchor device 16 to receive this route and update its forwarding state. It is possible to reduce this time significantly by letting the old gateway device 12A tunnel the traffic to its HIZ as in the Per-MS VPN Routing case above.

Figure 5:
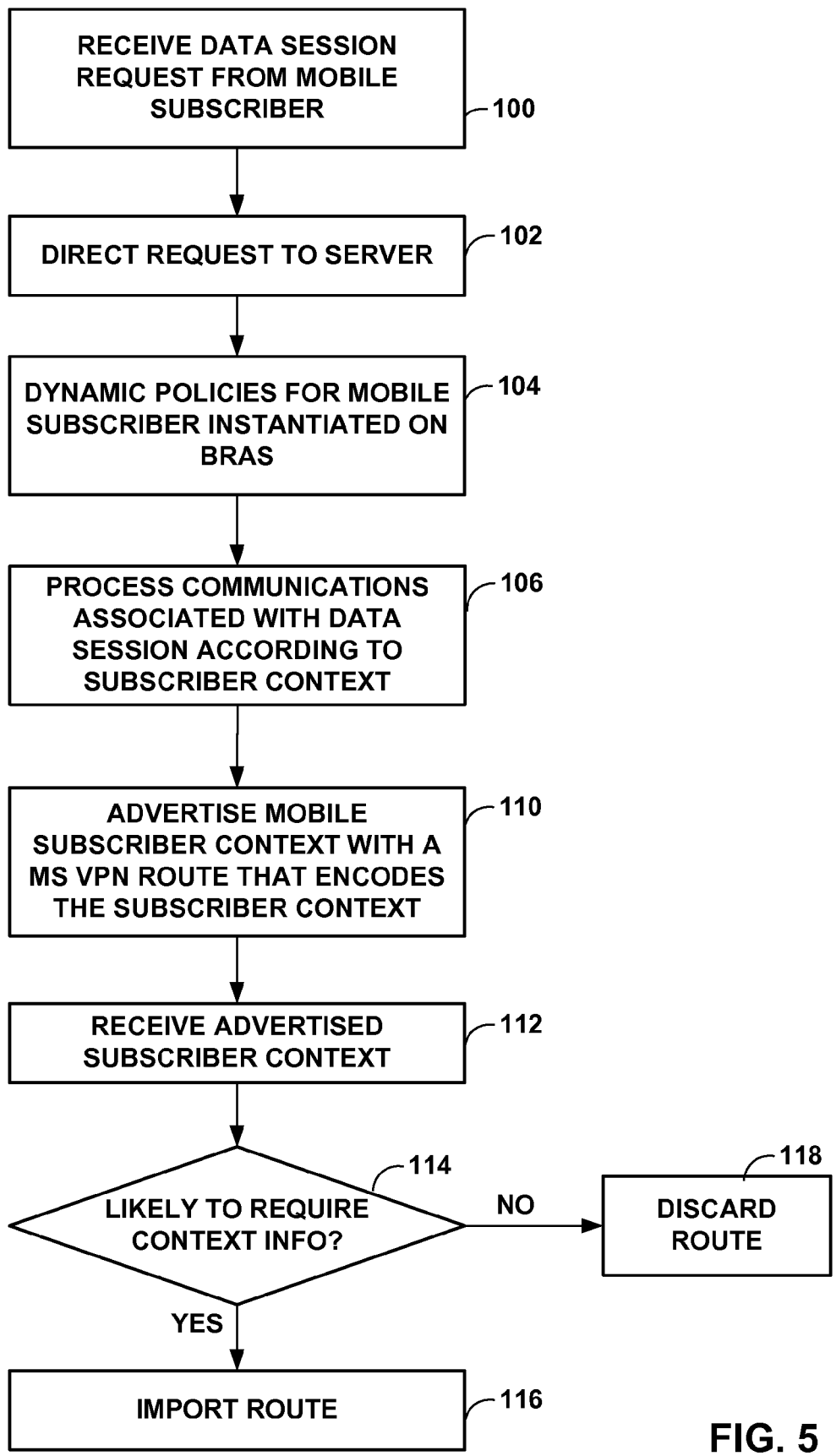
FIG. 5 is a flowchart illustrating example operation of a gateway device in transferring subscriber context in accordance with the principles of the invention.

FIG. 5 is a flowchart illustrating example operation of a gateway device in transferring subscriber context 46 when a subscriber device moves to a location requiring a new gateway device. For example, the gateway device may be one of gateway devices 12 and 30 (FIGS. 1 and 2). As mentioned above, the proposed network-based mobility architecture also includes an approach to the subscriber context transfer problem. Specifically, the approach described herein provides a subscriber context transfer mechanism for mobile subscriber management built on extensions to BGP and BGP-MPLS Layer 3 VPNs.

FIG. 5 will be explained with reference to FIG. 1, and assumes that gateway devices 12A-12B are broadband remote access servers (BRASs). As explained, subscriber management may instantiate dynamic policies on the BRAS upon relocation of the subscriber device. Consider first a wireline subscriber that is using a Session Initiation Protocol (SIP) application for voice communication. The mobile device 20 may be the SIP client, i.e., the SIP application may be running on the mobile device 20. When the SIP application starts, the BRAS receives SIP signaling from mobile device 20 and directs the SIP signaling to the SIP server, which in turn results in dynamic policies being instantiated on a BRAS (e.g. the filtering rules, policing rules, queuing rules, etc.). Once this is done the SIP application server is not involved in the data path of the SIP application.

Now consider the same case when a mobile subscriber such as mobile device 20 is using a SIP application. As long as the BRAS/gateway device 12 that the mobile device 20 is "connected to" stays fixed, the behavior is as described above for the wireline case. That is, when the SIP application starts, the BRAS receives signaling message in the form of a data session request from the mobile subscriber (100), and the BRAS directs the SIP signaling message to the SIP server (102). At this point, dynamic policies are instantiated on the BRAS, e.g., using RADIUS (104). The BRAS processes communications with mobile device 20 in accordance with the subscriber context of mobile device 20 including the policies that apply to mobile device 20 (106). However if the mobile device 20 moves such that it has to connect via a different Mobile BRAS/gateway device 12, there must be a mechanism for the new Mobile BRAS/gateway device 12 to instantiate the subscriber's policies. This is because the SIP application server is not involved anymore (as the SIP signaling has occurred and one point of macro mobility is to retain the subscriber's IP address).

One embodiment of a solution to this problem described herein uses a mechanism for the first BRAS (in this case, gateway device 12A) to transfer the context of the subscriber to the second BRAS (gateway device 12B). A dynamic context transfer protocol is described herein that leverages the existing IP/MPLS control plane. For example, techniques are described for providing an approach to the context transfer problem built on extensions to BGP and BGP-MPLS Layer 3 VPNs. The BRAS/gateway device 12 that wishes to advertise context information for mobile device 20 advertises a mobile subscriber VPN route advertisement as described above (110). This route advertisement contains BGP attributes that encode the context information, as shown in FIG. 3B. In some embodiments, the gateway device may be configured to advertise a mobile subscriber VPN route advertisement for each subscriber device preemptively, thereby enabling a "make before break" handoff in which the context information is transferred to the new gateway prior to handoff to that gateway. In other embodiments, the gateway device may be configured to advertise a mobile subscriber VPN route advertisement only upon a certain trigger that indicates that the subscriber will be moving or has moved to a different gateway.

The information elements and encoding of these attributes may take various forms. Upon receiving the mobile subscriber VPN route advertisement (112), all the BRASes in cellular network 10 that are likely to require the context transfer information (114) will import this route (116) while the other network elements discard the route (118). The route carries a "Context Transfer route target" that is configured only on potential BRASes that may potentially require the context transfer information. In this manner, the advertising BRAS sends the subscriber context to all neighboring BRAS routers to which the mobile subscriber can move to prior to the mobile subscriber relocating.

The context transfer mechanism described above may be deployed in conjunction with existing mobility techniques, such as Mobile IP. In other words, it is not necessary to deploy all of the network based mobility techniques described herein in order to deploy the context transfer technique described above.

Figure 6:
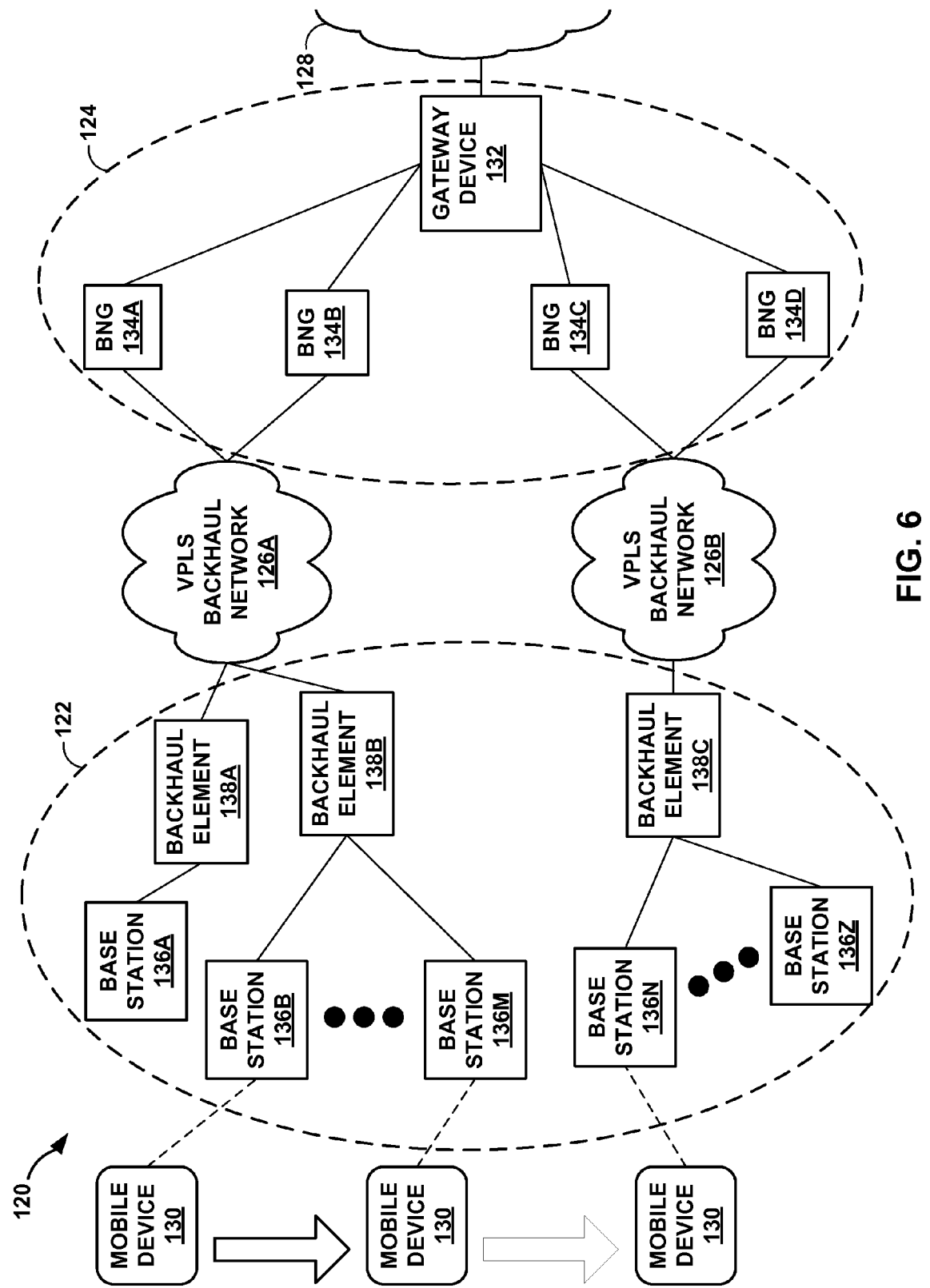
FIG. 6 is a block diagram illustrating an example cellular network that includes a cell site coupled to a metro regional site by Virtual Private LAN Service (VPLS) backhaul networks.

FIG. 6 is a block diagram illustrating an example cellular network 120 that utilizes Virtual Private LAN Service (VPLS) for micro mobility. In FIG. 6, cellular network 120 includes cell site 122 coupled to a metro regional site 124 by VPLS backhaul networks 126A-126B ("VPLS backhaul networks 126"). VPLS backhaul networks 126 may be IP/MPLS metro backhaul networks, and may include transport mechanisms such as Time Division Multiplexed (TDM), Metro-E, WiMax, Digital Subscriber Line (DSL), and the like. A mobile device 130 within cellular network 120 connects to a Wide Area Network (WAN) 128 (e.g., the Internet) using cellular network 120.

Mobility of a mobile device 130 that remains anchored at a single IP mobile gateway (e.g., gateway device 132) is called micro mobility. As shown in FIG. 6, gateway device 132 is connected to one or more BNGs 134A-134D ("BNGs 134"). Each BNG 134 aggregates traffic from a mobile backhaul network 126. In some aspects, BNGs 134 may be devices such as a WiMax Access Service Network (ASN) Gateway or a Long Term Evolution (LTE) Service Architecture Evolution (SAE) gateway. In some aspects, gateway device 132 may be a WiMax Connectivity Service Network (CSN) gateway or a LTE Packet Data Node (PDN) gateway. Gateway device 132 may serve as both an IP gateway device and a mobile BRAS.

As long as the IP gateway 132 of a mobile device 130 doesn't change, even though the mobile device 130 may move from one of base stations 136A-136Z to another or/and one BNG 134 to another, a micro mobility solution is sufficient to preserve the IP address and IP sessions of mobile device 130. For a particular IP gateway, the domain in which this IP gateway continues to be the IP gateway of a mobile subscriber is called the "micro mobility domain." The portion of cellular network 120 shown in FIG. 6 consists of a micro mobility domain. Note that mobile device 130 may move from one backhaul network 126A to another backhaul network 126B, but if the gateway device 132 used by mobile device 130 as the "next-hop" for IP reachability doesn't change, mobile device 130 is in the micro mobility domain of gateway device 132.

In FIG. 6, mobile device 130 is a mobile subscriber, the IP gateway of which is gateway device 132. As long as mobile device 130 is attached to one of base stations 136A-136Z ("base stations 136") it is said to be in the micro mobility domain of gateway device 132. Backhaul elements 138A-138C ("backhaul elements 138") are backhaul network elements to which base stations 136 are connected. Base stations 136 may be LTE base stations, IP base stations, and/or WiMax base stations.

A feature that enables VPLS to be a natural fit for micro mobility is the MAC learning capability in a VPLS. MAC learning allows the location of the mobile subscriber to be determined, i.e., the backhaul element to which the mobile subscriber is currently attached. MAC learning also allows dynamic update of that location at the IPNGs.

The micro mobility technique described herein utilizes VPLS deployed in the backhaul networks 126. For example, gateway device 30 (FIG. 2) executes VPLS module 45 to support VPLS in the control plane and data plane, which allows gateway device 132 to operate as a member of a VPLS instance. Backhaul elements 138 or the base stations 136 also support VPLS. For the rest of this section it is assumed that VPLS is deployed on backhaul elements 138, but not on the base stations 136. However, the discussion in this section is equally applicable to the case when VPLS is deployed on base stations 136 and/or backhaul elements 138. The backhaul networks 126 may be shared between multiple mobile service providers. This discussion will assume that there is a single VPLS instance in the backhaul networks 126 per mobile service provider, though there may in fact be multiple VPLS instances per mobile service provider.

This discussion will assume that backhaul elements 138 and gateway device 132 are configured with a VPLS instance "VPLS-A." Further, it is assumed that base stations 136 are the sites in VPLS-A on backhaul elements 138 respectively, and each of these connections are unique sites in VPLS-A.

Figure 7:
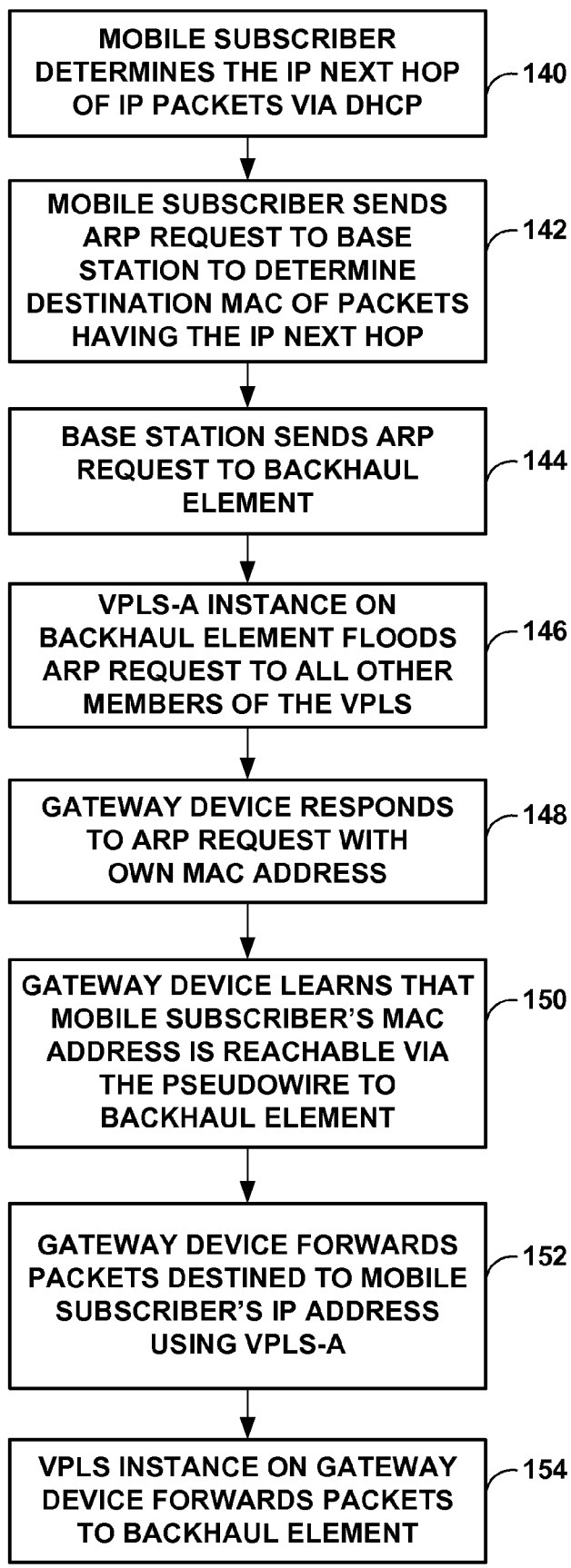
FIG. 7 is a flowchart illustrating example operation of network devices in a micro mobility domain consistent with the principles of the invention.

FIG. 7 is a flowchart illustrating example operation of network devices in a micro mobility domain consistent with the principles of the invention. FIG. 7 is explained with reference to FIG. 6, and illustrates forwarding at mobile device 130 and gateway device 132 when mobile device 130 is stationary. Mobile device 130 determines the IP address for the next-hop of IP packets via DHCP, typically using the name of the gateway server in the request (140). For packets in a subnet different from that of mobile device 130, this next-hop is gateway device 132. In order to determine the destination MAC of such packets, mobile device 130 sends an Address Resolution Protocol (ARP) request to base station 136B, where the ARP request specifies the IP address learned by the DHCP query (142). Base station 136B acts as a layer 2 device and sends this ARP request to backhaul element 138B (144). VPLS-A instance on backhaul element 138B floods this ARP request to all the other members of the VPLS (146). Gateway device 132 responds to this ARP request with its own MAC address (148). Further, gateway device 132 learns that the MAC address of mobile device 130 is reachable via the pseudowire (PW) between the gateway device and base station 136B (150). When gateway device 132 receives IP packets destined to the IP address of mobile device 130, gateway device 132 forwards these packets using VPLS-A through the VPLS pseudowire (152). These packets are forwarded by the VPLS instance on gateway device 132, to backhaul element 138B since the MAC address of mobile device 130 is reachable via the PW to backhaul element 138B (154).

Figure 8:
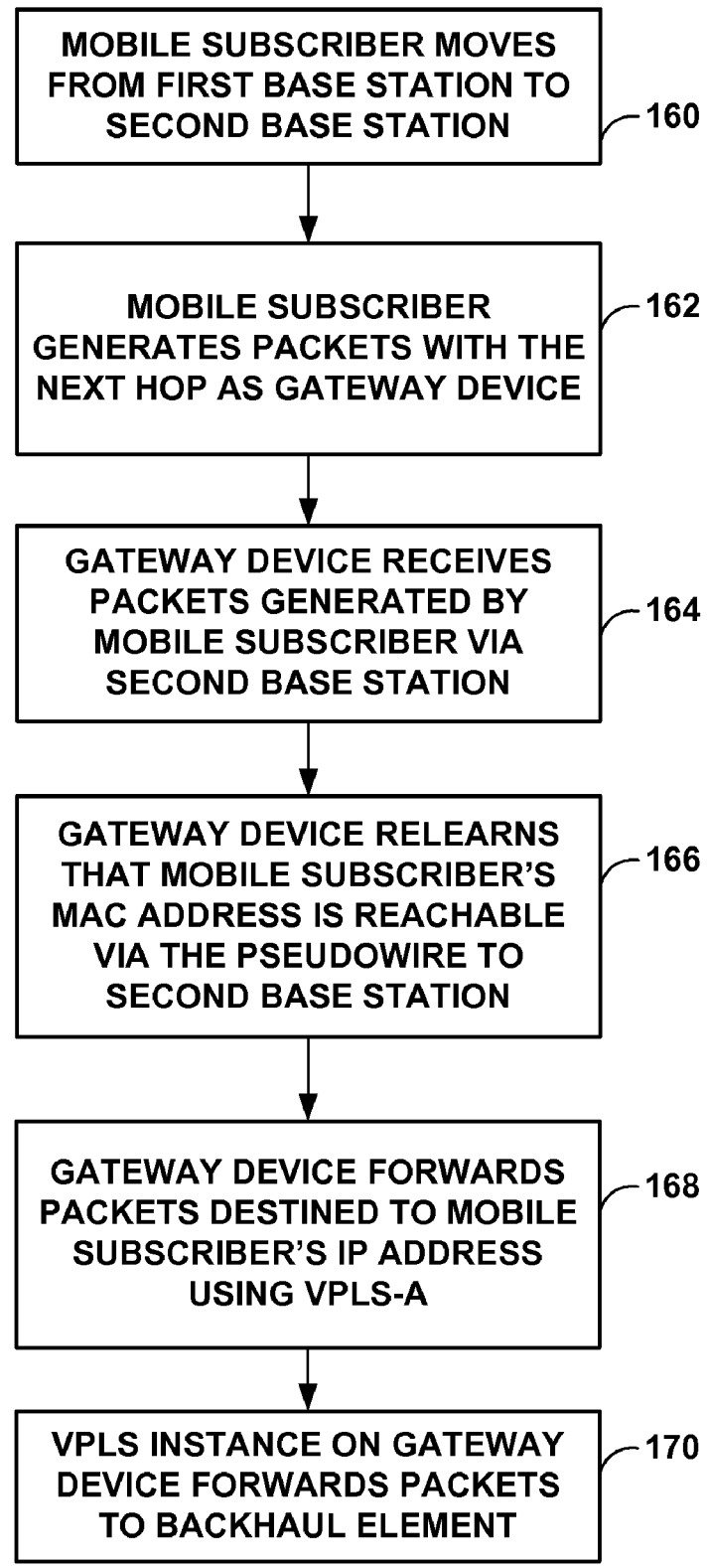
FIG. 8 is a flowchart illustrating another example operation of network devices in a micro mobility domain.

FIG. 8 is a flowchart illustrating another example operation of network devices in a micro mobility domain. FIG. 8 illustrates forwarding at a mobile device 130 and gateway device 132 when mobile device 130 moves from one base station to another.

Assume that mobile device 130 moves from base station 136B to base station 136M (160). Further assume that mobile device 130 generates packets with the next-hop as gateway device 132 (162). When gateway device 132 receives such packets (164), gateway device 132 re-learns that the MAC address of mobile device 130 is reachable via the pseudowire to base station 136M (166). This "re-learning" process enables gateway device 132 to track reachability to mobile device 130 as mobile device 130 moves. When gateway device 132 then receives IP packets destined to the IP address of mobile device 130, gateway device 132 forwards these packets using VPLS-A (168). These packets are forwarded by the VPLS instance on gateway device 132, to backhaul element 138B since the MAC address of mobile device 130 is reachable via the PW to backhaul element 138B (170).

The assumption that mobile device 130 generates packets with the next-hop as gateway device 132 for the "re-learning" to happen may not always be true. It may be required to flood some packets into the VPLS network 126 to ensure that the MAC address of the mobile device 130 is relearned. In some cases, the attaching base station may be required to generate a packet on behalf of mobile device 130 to enable re-learning. The generated packet may include the source MAC address of the base station to which the mobile device 130 moves. Further, such a packet will also enable other backhaul elements 138 to update their MAC cache entry for the MAC address of mobile device 130. VPLS may therefore be extended to cause the base station to which mobile device 130 moves to generate the packet on behalf of mobile device 130 to trigger re-learning of the MAC address of mobile device 130 when mobile device 130 moves.

This embodiment does not require all backhaul elements 138 to be in the same VPLS domain. Backhaul elements 138A and 138B can be in one domain while backhaul element 138C is in another domain. Further, it is also possible to have a different VPLS domain between gateway device 132 and the BNGs 134; and another VPLS domain between BNGs 134 and the backhaul elements 138. The proposed micro mobility techniques would reuse Inter-domain VPLS mechanisms.

It is possible to provide for IP gateway device redundancy. One mechanism to achieve this is to configure two gateway devices with the same IP address and the same Virtual Router Redundancy Protocol (VRRP) MAC address. Only one gateway device will be active at one point of time and receive traffic from mobile device 130. Only the active gateway device will forward traffic from upstream, while the secondary gateway device will drop the traffic from upstream. If the primary gateway device fails, the secondary gateway device will become the VRRP master and hence receive packets from the mobile devices.

The techniques set forth above for BGP-based macro mobility may be used in conjunction with the techniques described above for VPLS-based micro mobility. This section describes the procedures to be used when the BGP-based Macro Mobility techniques described herein are used, and a mobile subscriber moves from one micro mobility domain to another. These procedures are not necessary if VPLS micro mobility is used in conjunction with Mobile IP.

A mobile subscriber 130 in one micro mobility domain uses the gateway device (say gateway device 132) in that domain as its next-hop. Hence the mobile subscriber 130 uses the MAC address of the gateway device 132, which the mobile subscriber 130 learns via ARP, as the destination MAC address of the packets that mobile subscriber 132 generates. If the mobile subscriber moves from the micro mobility domain of gateway device 132 to the micro mobility domain of a second gateway device (not shown in FIG. 6), certain scenarios need to be handled.

The first scenario addresses what happens when the mobile subscriber sends a packet with the destination MAC address of gateway device 132. The packet is received by the second gateway device. For the second gateway device, the MAC of gateway device 132 is an unknown MAC address, and if the second gateway device were to follow default VPLS procedures the second gateway device would flood the packet since it is an unknown unicast packet. Instead, the second gateway device should route the packet. Thus the second gateway device must be able to realize based on the destination MAC address that the packet has to be treated "specially." There could be different mechanisms to achieve this. One mechanism may be for each gateway device to use a special well known MAC address or MAC address from a well known range.

Another scenario addresses what happens when a mobile subscriber sends an ARP request for the IP address of the second gateway device (since the second gateway device is the mobile subscriber's next-hop). In this case, gateway device 132 must respond to the ARP request with its MAC address.

The standard mobile subscriber behavior when sending packets to destinations in its own subnet would be for the mobile subscriber to send an ARP request for the destination IP address. When gateway device 132 receives this ARP request, gateway device 132 needs to respond with its own MAC address.

When used in WiMax networks, the micro mobility techniques described herein require the use of WiMax discovery mechanisms between the mobile subscriber and the WiMax Base Station. It does not require any changes to a mobile subscriber's WiMax equipment. The micro mobility techniques also retain the WiMax mechanisms that enable an IP gateway device (also known as an ASN Gateway) to discover the mobile subscriber and the base station for the mobile subscriber. The micro mobility techniques also retain the WiMax security mechanisms.

When the micro mobility techniques of this document are used, WiMax ASN centric mobility mechanisms must not be used. When the macro mobility techniques of this document are used, WiMax CSN centric mobility mechanisms that rely on Mobile IP must not be used. The context transfer mechanisms of this document can be used irrespective of which micro or macro mobility techniques are used.

A mobile subscriber's service experience depends on the QoS policies on the base station 136, BNG 134, Mobile backhaul network 126, gateway device 132 and the mobile BRAS. At minimum this requires that the mobile BRAS have the ability to influence the QoS policies on the base station 136 per subscriber. WiMax provides a mechanism for the ASN Gateway to control the QoS policies on the BS. This mechanism may or may not be suited to an IP/MPLS backhaul network.

The micro mobility techniques described herein using VPLS in the backhaul network also provides an approach for multicast. Specifically, multicast may be performed using Point-to-Multipoint Label Switched Paths (P2MP LSPs).

Various embodiments of the invention have been described. These and other embodiments are within the scope of the following claims.

The invention claimed is:

1. A method comprising:
receiving, with a first network device of a cellular network, a request to initiate a data session between a mobile device and a packet-based computer network, the mobile device in wireless communication with a first base station associated with the first network device;
processing, with the first network device, data communications associated with the data session in accordance with a subscriber context associated with the mobile device, wherein the subscriber context specifies subscriber-specific information defining one or more policies that are applied to the data communications; and
with the first network device, advertising a mobile subscriber (MS) virtual private network (VPN) route advertisement to other network devices in the cellular network using an extended routing protocol, wherein the MS VPN route advertisement encodes the subscriber context for the mobile device in accordance with the extended routing protocol to enable the other network devices to process the data communications associated with the data session in accordance with the subscriber context.

2. The method of claim 1, wherein the extended routing protocol comprises an extended Border Gateway Protocol (BGP).

3. The method of claim 2, wherein the MS VPN route advertisement encodes the subscriber context as BGP attributes of the MS VPN route advertisement.

4. The method of claim 2, wherein advertising the MS VPN route advertisement comprises advertising a MS VPN route advertisement that encodes the subscriber context as network layer reachability information (NLRI) that is communicated in accordance with the extended BGP protocol.

5. The method of claim 2, wherein the extended BGP protocol defines the subscriber context as opaque BGP data such that other network devices that do not support the extension ignore the encoded subscriber context.

6. The method of claim 1, wherein the MS VPN route advertisement includes a context transfer route target that is used by the other network devices in determining whether to import the MS VPN route advertisement.

7. The method of claim 1, wherein the subscriber context comprises one or more of a policy specifying a level or quality of service associated with the mobile subscriber, a policy specifying QoS scheduling, a policy specifying rate-limiting, a policy specifying policing parameters, a policy specifying one or more per-flow classifiers/filters, a policy specifying one or more encryption keys, a policy specifying one or more multicast group memberships of the mobile subscriber, and a policy specifying charging and accounting information to account for one or more services provided to the mobile subscriber.

8. The method of claim 1, wherein processing the communications associated with the session includes one or more of applying encryption keys defined within the subscriber context to encrypt and decrypt the communications, translating an Internet protocol (IP) address of the communications to an IP address defined within the subscriber context, and updating charging and accounting information within the subscriber context based on the communications.

9. The method of claim 1, wherein the subscriber context specifies subscriber-specific information concerning statistics and session states corresponding to the data session initiated by the mobile device.

10. The method of claim 1, wherein the network device comprises one or both of an Internet Protocol Network device that provides a gateway between a service provider network and a Wide Area Network (WAN), and a broadband remote access server (BRAS) that provides subscriber management services to the mobile device.

11. The method of claim 1, further comprising:
in response to receiving the request, accessing the subscriber context for the mobile device from a server network device based on the request; and
storing the subscriber context for the mobile device at the network device.

12. A network device of a cellular network comprising:
an interface configured to receive a request to initiate a data session between a mobile device and a packet-based computer network, the mobile device in wireless communication with a first base station associated with the first network device; and
a control unit configured to process data communications associated with the data session in accordance with a subscriber context associated with the mobile device, wherein the subscriber context specifies subscriber-specific information defining one or more policies that are applied to the data communications,
wherein the control unit is configured to execute a routing protocol that has been extended to advertise a mobile subscriber (MS) virtual private network (VPN) route advertisement to other network devices in the cellular network, wherein the MS VPN route advertisement encodes the subscriber context for the mobile device in accordance with the extended routing protocol to enable the other network devices to process the data communications associated with the data session in accordance with the subscriber context.

13. The network device of claim 12, wherein the extended routing protocol comprises an extended Border Gateway Protocol (BGP).

14. The network device of claim 13, wherein the MS VPN route advertisement encodes the subscriber context as BGP attributes of the MS VPN route advertisement.

15. The network device of claim 13, wherein the MS VPN route advertisement encodes the subscriber context as network layer reachability information (NLRI) that is communicated in accordance with the extended BGP protocol.

16. The network device of claim 13, wherein the extended BGP protocol defines the subscriber context as opaque BGP data such that other network devices that do not support the extension ignore the encoded subscriber context.

17. The network device of claim 12, wherein the MS VPN route advertisement includes a context transfer route target that is used by the other network devices in determining whether to import the MS VPN route advertisement.

18. The network device of claim 12, wherein the subscriber context comprises one or more of a policy specifying a level or quality of service associated with the mobile subscriber, a policy specifying QoS scheduling, a policy specifying rate-limiting, a policy specifying policing parameters, a policy specifying one or more per-flow classifiers/filters, a policy specifying one or more encryption keys, a policy specifying one or more multicast group memberships of the mobile subscriber, and a policy specifying charging and accounting information to account for the services provided to the mobile subscriber.

19. The network device of claim 12, wherein the control unit is configured to process the communications associated with the session by one or more of applying encryption keys defined within the subscriber context to encrypt and decrypt the communications, translating an Internet protocol (IP) address of the communications to an IP address defined within the subscriber context, and updating charging and accounting information within the subscriber context based on the communications.

20. The network device of claim 12, wherein the subscriber context specifies subscriber-specific information concerning statistics and session states corresponding to the data session initiated by the mobile device.

21. The network device of claim 12, wherein the network device comprises one or both of an Internet Protocol Network device that provides a gateway between a service provider network and a Wide Area Network (WAN), and a broadband remote access server (BRAS) that provides subscriber management services to the mobile device.

22. A system comprising:
a first network device associated with a first base station;
a second network device associated with a second base station;
a mobile device in wireless communication with the first base station; and
a third network device that stores a subscriber context associated with the mobile device, wherein the first network device comprises:
an interface configured to receive a request from the mobile device to initiate a data session between the mobile device and a packet-based computer network; and
a control unit configured to process data communications associated with the data session in accordance with the subscriber context associated with the mobile device, wherein the subscriber context specifies subscriber-specific information defining one or more policies that are applied to the data communications,
wherein the control unit is configured to execute a routing protocol that has been extended to advertise a mobile subscriber (MS) virtual private network (VPN) route to the second network device, wherein the MS VPN route advertisement encodes the subscriber context for the mobile device in accordance with the extended routing protocol to enable the second network device to process the data communications associated with the data session in accordance with the subscriber context.

23. A system comprising:
a first network device associated with a first base station;
a second network device associated with a second base station;
a mobile device in wireless communication with the first base station; and
a third network device that stores a subscriber context associated with the mobile device, wherein the first network device comprises:
an interface configured to receive a request from the mobile device to initiate a data session between the mobile device and a packet-based computer network, wherein in response to receiving the request from the mobile device, the first network device accesses the subscriber context for the mobile device from the third network device based on the request, and wherein the first network device stores the subscriber context accessed from the third network device; and
a control unit configured to process data communications associated with the data session in accordance with the subscriber context associated with the mobile device, wherein the subscriber context specifies subscriber-specific information defining one or more policies that are applied to the data communications,
wherein the control unit is configured to execute a routing protocol that has been extended to advertise a mobile subscriber (MS) virtual private network (VPN) route to the second network device, wherein the MS VPN route advertisement encodes the subscriber context for the mobile device in accordance with the extended routing protocol to enable the second network device to process the data communications associated with the data session in accordance with the subscriber context.

24. The system of claim 22, wherein the second network device comprises an interface configured to receive the MS VPN route advertisement advertised by the first network device, and wherein the second network device comprises a control unit configured to execute a routing protocol that is extended to import the MS VPN route advertisement when the second network device is likely to require the subscriber context and discard the MS VPN route advertisement when the second network device is not likely to require the subscriber context.

25. The system of claim 24, wherein the MS VPN route advertisement includes a context transfer route target, and wherein the second network device is configured with the context transfer route target when the second network device is likely to require the subscriber context.

26. The system of claim 22, wherein the second network device comprises a control unit, and wherein when the mobile device ceases wireless communication with the first base station and begins wireless communication with the second base station, the control unit of the second network device is configured to process data communications associated with the data session in accordance with the subscriber context associated with the mobile device, and wherein an Internet Protocol (IP) address associated with the mobile device remains unchanged.

27. The system of claim 22, wherein the extended routing protocol comprises an extended Border Gateway Protocol (BGP), and wherein the MS VPN route advertisement encodes the subscriber context as BGP attributes of the MS VPN route advertisement.

28. The system of claim 22, wherein the first network device and the second network device are configured to execute a Mobile IP communications protocol that allows the mobile device to cease wireless communication with the first base station and begin wireless communication with the second base station while an Internet Protocol (IP) address associated with the mobile device remains unchanged.

29. A non-transitory computer-readable storage medium comprising instructions for causing a programmable processor of a first network device of a cellular network to:
receive a request to initiate a data session between a mobile device and a packet-based computer network, the mobile device in wireless communication with a first base station associated with the first network device;
process data communications associated with the data session in accordance with a subscriber context associated with the mobile device, wherein the subscriber context specifies subscriber-specific information defining one or more policies that are applied to the data communications; and advertise a mobile subscriber (MS) virtual private network (VPN) route advertisement to other network devices in the cellular network using an extended routing protocol, wherein the MS VPN route advertisement encodes the subscriber context for the mobile device in accordance with the extended routing protocol to enable the other network devices to process the data communications associated with the data session in accordance with the subscriber context.

30. The method of claim 1, wherein the subscriber context encoded by the MS VPN route advertisement comprises a policy that defines charging and accounting information to account for one or more services provided to the mobile device.

31. The network device of claim 12, wherein, in response to receiving the request, the network device accesses the subscriber context for the mobile device from a server network device based on the request, and stores the subscriber context for the mobile device at the network device.

* * * * *